US006869202B2

(12) United States Patent
Tufte

(10) Patent No.: US 6,869,202 B2
(45) Date of Patent: Mar. 22, 2005

(54) LIGHTING APPARATUS

(76) Inventor: Brian N. Tufte, 17488 Wexford Dr., Eden Prairie, MN (US) 55347

( * ) Notice: Subject to any disclaimer, the term of this patent is extended or adjusted under 35 U.S.C. 154(b) by 0 days.

(21) Appl. No.: 10/074,162

(22) Filed: Feb. 12, 2002

(65) Prior Publication Data

US 2002/0105800 A1 Aug. 8, 2002

Related U.S. Application Data

(63) Continuation-in-part of application No. 09/991,078, filed on Nov. 16, 2001, which is a continuation-in-part of application No. 09/372,643, filed on Aug. 11, 1999, now Pat. No. 6,371,634.

(51) Int. Cl.$^7$ ................................ F21S 4/00; F21S 8/10
(52) U.S. Cl. ....................... 362/224; 362/477; 362/505; 362/511
(58) Field of Search .................. 362/84, 224, 307, 362/360, 505, 511, 339, 477, 217, 219, 222, 223, 311

(56) References Cited

U.S. PATENT DOCUMENTS

| | | |
|---|---|---|
| 1,647,014 A | 10/1927 | Pattison |
| 1,729,274 A | 9/1929 | Millar |
| 1,779,180 A | 10/1930 | Macrae et al. |
| 1,972,283 A | 9/1934 | Zimmers |
| 2,300,067 A | 10/1942 | Schwab |
| 2,339,085 A | 1/1944 | Luckiesh |
| 2,525,001 A | 10/1950 | Sherwood |
| 2,561,756 A | 7/1951 | Shock |
| 2,587,807 A | 3/1952 | Arenberg et al. |
| 2,930,885 A | 3/1960 | Ehrenfreund |
| 2,959,146 A | 11/1960 | Erkert |
| 3,140,111 A | 7/1964 | Dabroski |

(List continued on next page.)

OTHER PUBLICATIONS

Light Tech LLC., "Decorative Cable Lights," brochure, copyright 1998.
Flex Glo Wire, Inc., "Flex Glo Wire Specifications," Oct. 15, 1998.
Selected pages from http://www.aqualuce.com/montka-j.html, 2 pages, downloaded Jun. 3, 2000.
"Eagle Mouldings Specialty Trim & Extrusions," brochure, 6 pages, prior to Aug. 11, 1999.
Lumenyte International Corporation, "Cove Lighting Applications," 1 page, copyright, Mar. 19, 1998.
Lumenyte International Corporation, "Sta–Flex LEF™ 510M Linear Emitting Fiber," 2 pages, copyright Mar. 6, 2001.
Lumenyte International Corporation, "Sta–Flex LEF™ 310 Linear Emitting Fiber," 2 pages, copyright Mar. 19, 1998.
Lumenyte International Corporation, "Sta–Flex SFR™ 510 Linear Fiber," 2 pages, copyright Mar. 19, 1998.
Lumenyte International Corporation, "Sta–Flex SFR™ 410M Linear Emitting Fiber," 2 pages, copyright Mar. 6, 2001.
3M Marine Products, http://www.3m.com/US/auto_marine_aero/marine/catalog/index.jhtml, 1 page, downloaded Feb. 11, 2002.

(List continued on next page.)

*Primary Examiner*—Alan Cariaso
*Assistant Examiner*—Guiyoung Lee
(74) *Attorney, Agent, or Firm*—Brian N. Tufte

(57) ABSTRACT

A lighting apparatus is disclosed for illuminating side surfaces of objects or equipment including, for example, vehicles including boats, retail and/or store shelving and/or equipment, bars, desks, counters, walls, railings, steps, and/or any other object or surface, as desired. In some embodiments, the lighting apparatus includes a bumper. When so provided, the lighting apparatus may help provide a level of protection to objects and/or surfaces that are subject to bumping, sliding or other abuse.

33 Claims, 34 Drawing Sheets

U.S. PATENT DOCUMENTS

| Patent No. | | Date | Inventor(s) | Ref. |
|---|---|---|---|---|
| 3,196,265 | A | 7/1965 | Schneider | |
| 3,197,189 | A | 7/1965 | Pemper et al. | |
| 3,317,722 | A | 5/1967 | Whitney | |
| 3,359,030 | A | 12/1967 | Newman | |
| 3,473,836 | A | 10/1969 | Halter | |
| 3,612,848 | A | 10/1971 | Koch et al. | |
| 3,639,748 | A | 2/1972 | Pearson et al. | |
| 3,675,527 | A | 7/1972 | Reeder, Jr. | |
| 3,722,876 | A | 3/1973 | Schwenk | |
| 3,865,358 | A | 2/1975 | Butters | |
| 3,885,144 | A | 5/1975 | Lewis et al. | |
| 4,107,767 | A | 8/1978 | Anquetin | |
| 4,213,644 | A | 7/1980 | Scrivo et al. | |
| 4,234,907 | A * | 11/1980 | Daniel | 362/556 |
| 4,245,281 | A | 1/1981 | Ziaylek, Jr. | |
| 4,270,787 | A | 6/1981 | Savell | |
| 4,360,859 | A | 11/1982 | Ziaylek, Jr. | |
| 4,376,966 | A | 3/1983 | Tieszen | |
| 4,445,163 | A | 4/1984 | Ziaylek, Jr. | |
| 4,625,266 | A | 11/1986 | Winter | |
| 4,740,870 | A | 4/1988 | Moore et al. | |
| 4,947,293 | A | 8/1990 | Johnson et al. | |
| 4,954,932 | A | 9/1990 | Isenga | |
| 4,955,044 | A | 9/1990 | Amstutz et al. | |
| 4,964,760 | A | 10/1990 | Hartman | |
| 4,996,634 | A | 2/1991 | Haneda et al. | |
| 5,023,762 | A | 6/1991 | Tieszen | |
| 5,096,753 | A | 3/1992 | McCue et al. | |
| 5,268,824 | A | 12/1993 | Czipri | |
| 5,304,993 | A | 4/1994 | Handsaker | |
| 5,337,225 | A | 8/1994 | Brookman | |
| 5,430,627 | A * | 7/1995 | Nagano | 362/146 |
| 5,434,013 | A | 7/1995 | Fernandez | |
| 5,469,342 | A | 11/1995 | Chien | |
| 5,475,574 | A | 12/1995 | Chien | |
| 5,485,355 | A | 1/1996 | Voskoboinik et al. | |
| 5,495,401 | A | 2/1996 | Evans | |
| 5,499,170 | A * | 3/1996 | Gagne | 362/84 |
| 5,523,923 | A * | 6/1996 | Stowe, Jr. | 362/505 |
| 5,566,384 | A | 10/1996 | Chien | |
| 5,570,945 | A | 11/1996 | Chien et al. | |
| 5,579,429 | A | 11/1996 | Naum | |
| 5,611,621 | A | 3/1997 | Chien | |
| 5,613,750 | A | 3/1997 | Roe | |
| 5,636,916 | A | 6/1997 | Sokolowski | |
| 5,678,914 | A | 10/1997 | Dealey et al. | |
| 5,711,592 | A * | 1/1998 | Hotta | 362/496 |
| 5,730,079 | A | 3/1998 | Totty et al. | |
| 5,737,472 | A | 4/1998 | Bernasson et al. | |
| 5,746,501 | A | 5/1998 | Chien | |
| 5,753,381 | A * | 5/1998 | Feldman et al. | 428/696 |
| 5,775,016 | A * | 7/1998 | Chien | 40/544 |
| 5,869,930 | A | 2/1999 | Baumberg et al. | |
| 5,871,269 | A | 2/1999 | Chien | |
| 5,873,646 | A | 2/1999 | Fjaestad et al. | |
| 5,902,034 | A * | 5/1999 | Santosuosso et al. | 362/125 |
| 5,903,695 | A | 5/1999 | Zarian et al. | |
| 5,915,830 | A | 6/1999 | Dickson et al. | |
| 5,917,288 | A | 6/1999 | Feldman et al. | |
| 6,019,476 | A | 2/2000 | Kischner | |
| 6,033,085 | A | 3/2000 | Bowker | |
| 6,050,211 | A | 4/2000 | Yamaguchi | |
| 6,065,852 | A | 5/2000 | Crumley | |
| 6,074,071 | A | 6/2000 | Baumberg et al. | |
| 6,082,867 | A | 7/2000 | Chien | |
| 6,113,246 | A | 9/2000 | Ruh | |
| 6,120,160 | A | 9/2000 | Nakagawa | |
| 6,129,442 | A | 10/2000 | Hoefling et al. | |
| 6,152,586 | A | 11/2000 | Dealey et al. | |
| 6,179,431 | B1 | 1/2001 | Chien | |
| 6,186,649 | B1 * | 2/2001 | Zou et al. | 362/347 |
| 6,231,217 | B1 | 5/2001 | Krippelz, Sr. | |
| 6,270,229 | B1 | 8/2001 | Chien | |
| 6,278,827 | B1 * | 8/2001 | Sugiyama et al. | 385/123 |
| 6,364,293 | B1 | 4/2002 | Beckett | |
| 6,371,634 | B1 | 4/2002 | Tufte | |
| 6,450,678 | B1 | 9/2002 | Bayersdorfer | |
| 6,461,028 | B1 | 10/2002 | Huang | |
| 6,523,986 | B1 | 2/2003 | Hoffman | |
| 6,526,200 | B1 | 2/2003 | Davie | |

OTHER PUBLICATIONS

3M Automotive, Marine and Aerospace, http://products.3m.com/usenglish/auto_marine_aero/marine-.jhtml, 1 page, downloaded Feb. 11, 2002.

3M U.S., http://www.3m.com/about3M/technologies/light-fiber, 30 pages, downloaded Feb. 11, 2002.

http://www.elam.co.il, 24 pages, downloaded Feb. 11, 2002.

U.S. Appl. No. 09/991,078, filed Nov. 16, 2001, entitled, "Lighting Apparatus."

U.S. Appl. No. 10/074,162, filed Feb. 12, 2002, entitled, "Lighting Apparatus."

U.S. Appl. No. 10/074,364, filed Feb. 12, 2002, entitled, "Lighting Apparatus."

U.S. Appl. No. 10/074,356, filed Feb. 12, 2002, entitled, "Lighting Apparatus."

U.S. Appl. No. 10/074,362, filed Feb. 12, 2002, entitled, "Lighting Apparatus."

U.S. Appl. No. 10/075,488, filed Feb. 12, 2002, entitled, "Lighting Apparatus."

U.S. Appl. No. 10/075,489, filed May 12, 2002, entitled, "Lighting Apparatus."

* cited by examiner

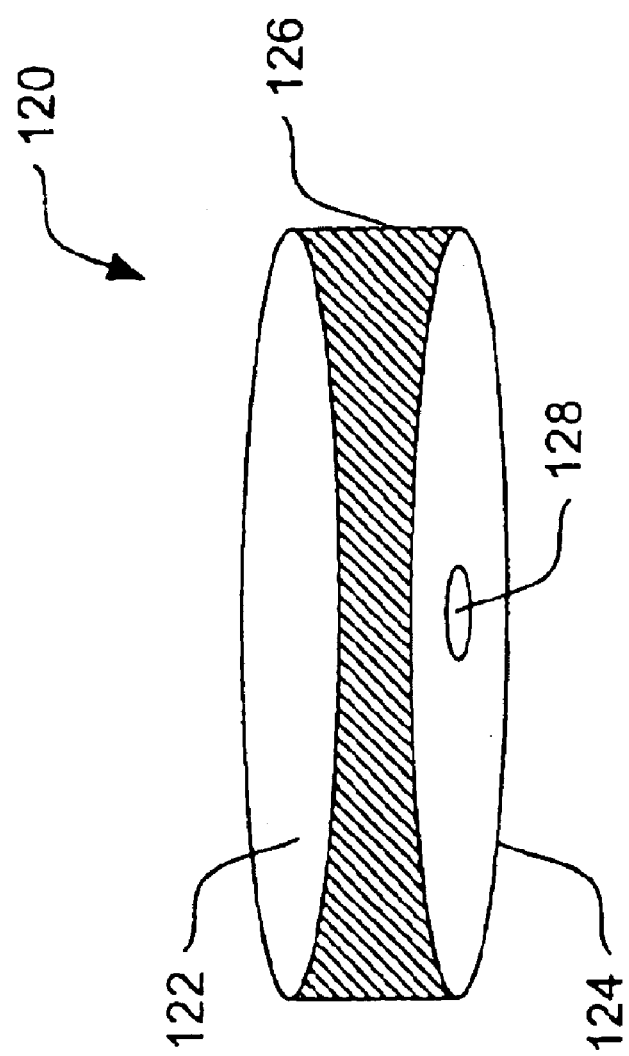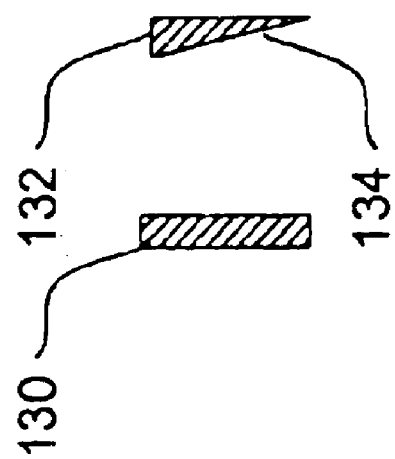
FIG. 8

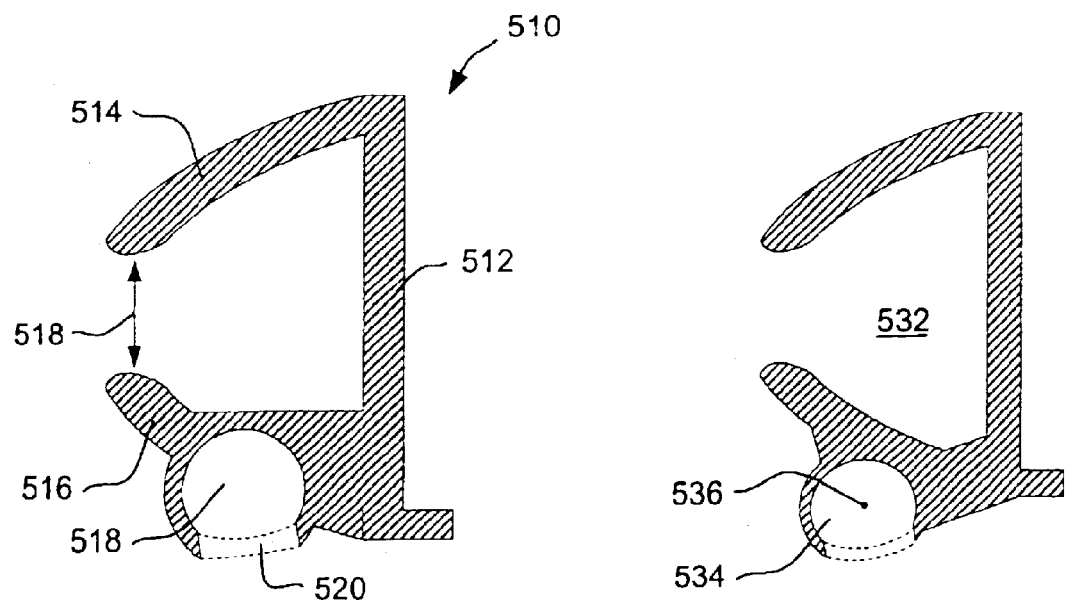
FIG. 22   FIG. 23
FIG. 24

LIGHTING APPARATUS

This application is a continuation-in-part of co-pending U.S. patent application Ser. No. 09/991,078, filed Nov. 16, 2001, which is a continuation-in-part of U.S. patent application Ser. No. 09/372,643, filed Aug. 11, 1999, now U.S. Pat. No. 6,371,634 both of which are incorporated herein by reference.

BACKGROUND OF THE INVENTION

This invention relates to lights, and more particularly, to lights for illuminating, protecting and/or increasing the visual appeal of an object or surface.

SUMMARY OF THE INVENTION

The present invention provides a lighting apparatus that may be used to illuminate an object or surface. In one illustrative embodiment, the light apparatus is used to help improve the visibility of a vehicle by illuminating one or more side surfaces of the vehicle. The side surfaces of many vehicles provide a relatively large area that, when illuminated, can significantly increase the visibility of the vehicle, especially at night. It is believed that by providing such visibility, vehicle safety can be significantly improved.

In other illustrative embodiments, the light apparatus may be used to illuminate other objects or equipment including, for example, retail and/or store shelving and/or equipment, bars, desks, counters, walls, railings, steps, and/or any other object or surface, as desired. In some embodiments, the lighting apparatus includes a bumper. When so provided, the lighting apparatus may help provide a level of protection to objects and/or surfaces that are subject to bumping, sliding or other abuse. In other illustrative embodiments, the lighting apparatus may be used to increase the visual appeal of an object or surface, such as a wall, a toy, an appliance or any other object, as desired.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 8 is a perspective view of another illustrative boat lighting apparatus in accordance with the present invention;

FIG. 22 is a cross-sectional side view of another illustrative lighting apparatus that includes a carrier that is adapted to receive a light source;

FIG. 23 is a cross-sectional side view of yet another illustrative lighting apparatus that includes a carrier that is adapted to receive a light source;

FIG. 24 is a cross-sectional side view of an illustrative Fresnel lens that may be used in accordance various embodiments of the present invention;

DETAILED DESCRIPTION OF THE PREFERRED EMBODIMENTS

Figure 1:
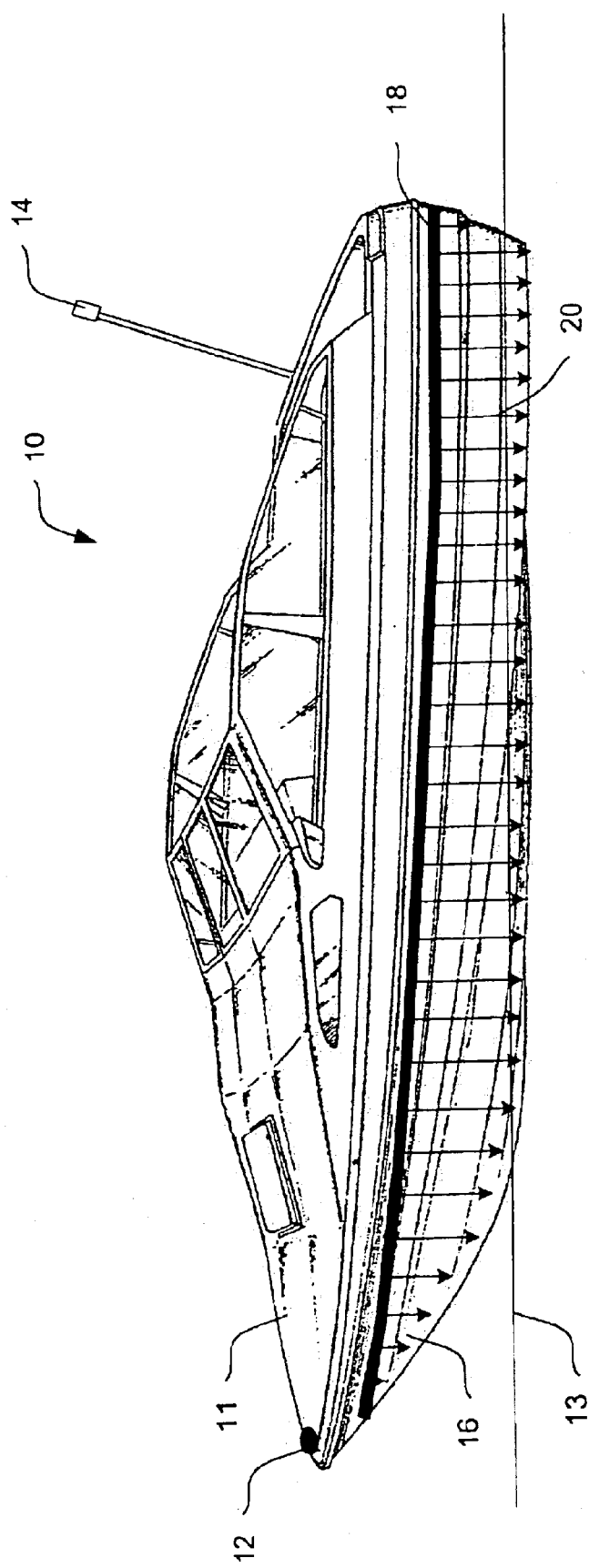
FIG. 1 is a perspective view of a boat having a first illustrative boat lighting apparatus.

FIG. 1 is a perspective view of a boat 10 having a first illustrative boat lighting apparatus in accordance with the present invention. The boat is generally shown at 10, and includes an upper deck 11 extending over a hull 16. The hull 16 extends generally down from the upper deck 11 toward an expected water line 13. The hull 16 may also extend generally inward, as shown.

Prior art navigation lights typically include forward running lights 12 and a rear masthead light 14. The forward running lights 12 typically include a red port light and a green starboard light. In many cases, the forward running lights 12 are provided in a relatively small housing mounted to the front of the boat. The rear masthead light 14 is shown mounted higher than the forward running lights 12, and is visible from the front of the boat.

This lighting configuration may be adequate for experienced boaters traveling in relatively low traffic waterways under good weather conditions. However, under other conditions, they are less desirable. Many of today's waterways are extremely crowded, often occupied with high powered boats driven by inexperienced and inattentive boaters. Safely operating a boat at night under these conditions can be a challenge. Depth perception is limited, and lights along the shoreline can cast misleading reflections on the water. In many instances, simply identifying boats via the forward running lights 12 and the masthead light 14 can be difficult, let along determining the size, direction, speed, and other factors needed to safely travel the waterways.

To augment the basic running lights 12 and 14 shown in FIG. 1, the present invention contemplates providing a boat lighting apparatus that improves the visibility of a boat by illuminating one or more side surfaces of the hull 16 of the boat 10. The hull 16 of the boat provides a relatively large area that, when illuminated, can significantly increase the visibility of a boat 10. In addition, the size, direction, and speed of a boat 10 can more readily be determined, even by novice or inattentive boaters. It is believed that by providing such visibility, boat safety can be significantly improved.

In the illustrative embodiment shown in FIG. 1, a boat lighting apparatus 18 is provided along the length of the hull 16 of the boat 10. The boat lighting apparatus 18 includes one or more light sources for producing light rays 20. The boat lighting apparatus 18 may be mounted to the boat and configured such that at least a portion of the light rays 20 illuminate a portion of the hull 16. In the embodiment shown, the boat lighting apparatus 18 provides light rays 20 that illuminate a substantial portion of the outer surface of the hull 16. Although not shown, the boat lighting apparatus 18 may continue around the perimeter of the boat hull 16, and illuminate both side surfaces of the hull and the back surface of the hull. The boat lighting apparatus 18 may provide a different color light for each side of the boat, such as a red light on the port side, a green light on the starboard side and a while light on the back side.

It is contemplated that the boat lighting apparatus 18 may or may not include a redirector (see below) for redirecting at least a portion of the light rays 20 to the side surface of the hull 16. The redirector may also prevent at least a portion of the light rays from traveling horizontally away and/or upward from the hull 16 of the boat 10.

A method of the present invention includes the steps of providing one or more light sources, and mounting the one or more light sources to the boat such that when energized, the one or more light sources illuminate a side surface of the hull 16.

Figure 2:
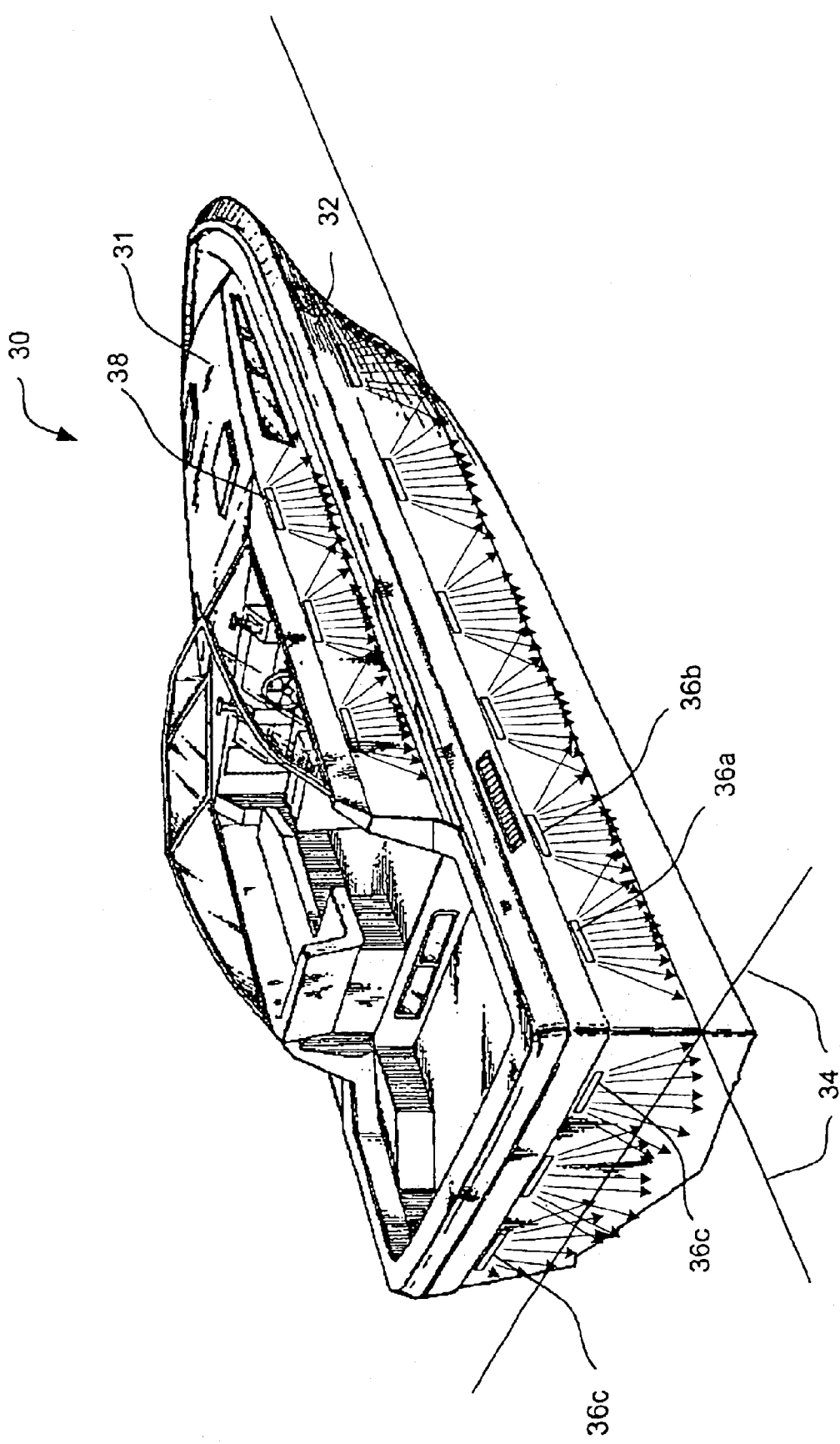
FIG. 2 is a perspective view of a boat having another illustrative boat lighting apparatus.

FIG. 2 is a perspective view of a boat having another illustrative boat lighting apparatus. The boat is generally shown at 30, and includes an upper deck 31 extending over a hull 32. The hull 32 extends generally down from the upper deck 31 toward an expected water line 34. The hull 32 may also extends generally inward, as shown. In this embodiment, a number of boat lights 36a, 36b, 36c and 36d are mounted to the hull 32 of the boat 30. Boat lights 36a and 36b are mounted to the starboard side of the hull 32, and boat lights 36c and 36d are mounted to the back of the hull 32.

Figure 3:
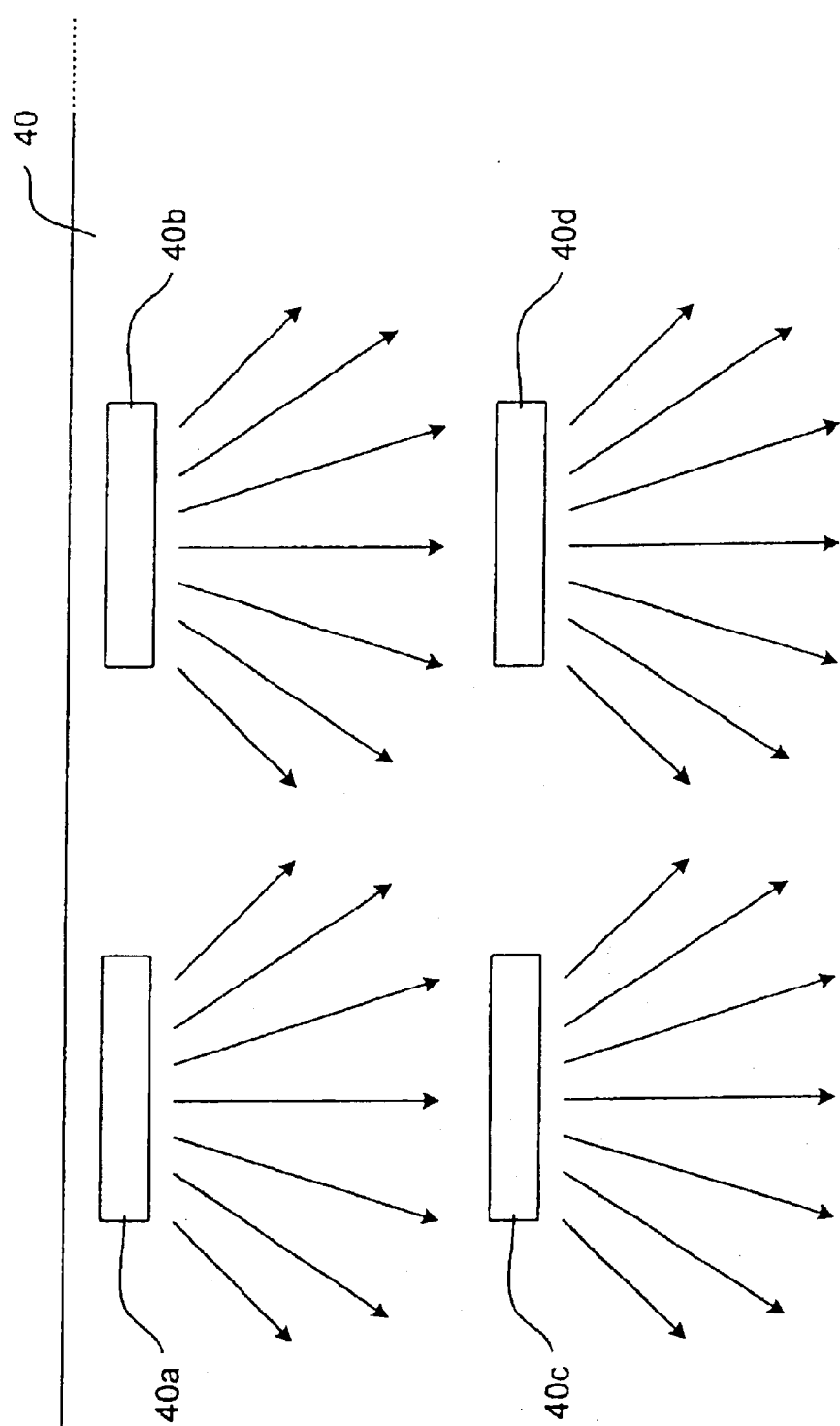
FIG. 3 is a schematic view of a boat hull having a number of boat lights, each directing light rays in a downward direction.
Figure 4:
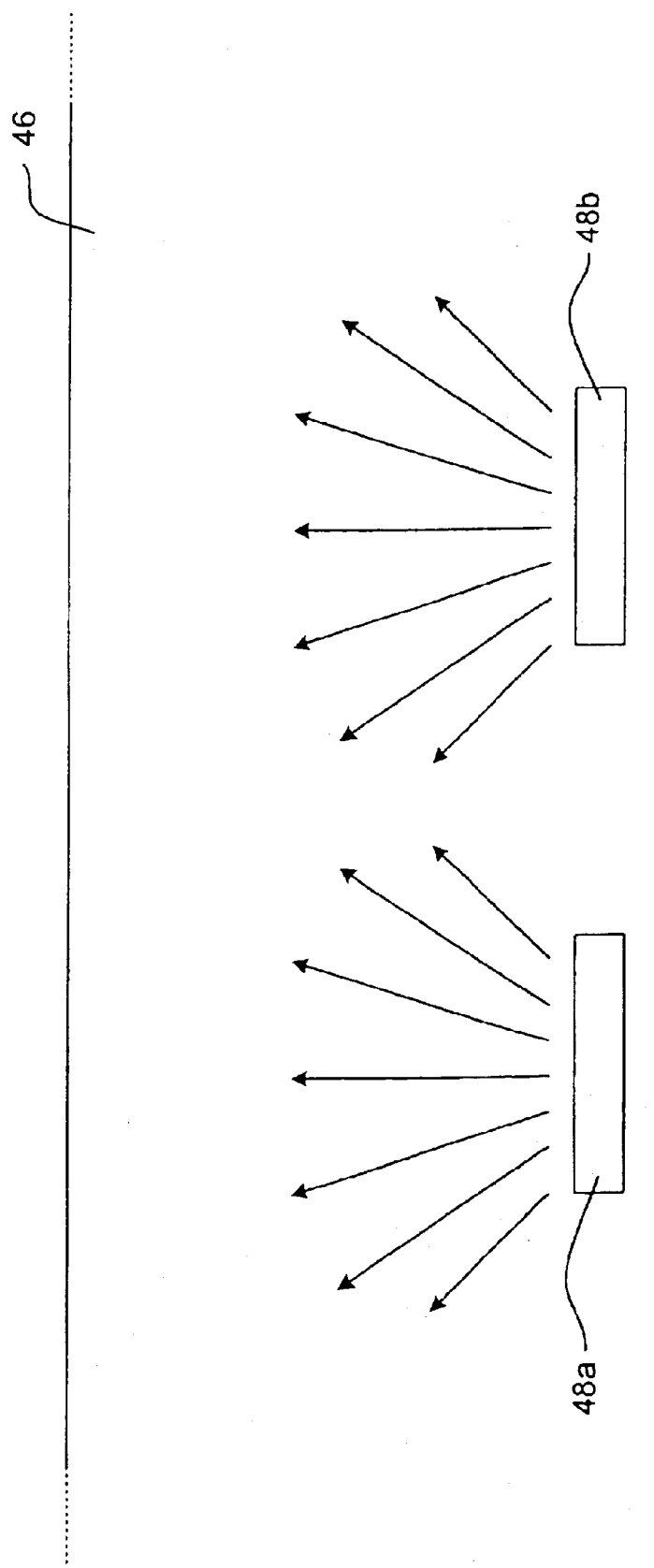
FIG. 4 is a schematic view of a boat hull having a number of boat lights, each directing light rays in an upward direction.
Figure 5:
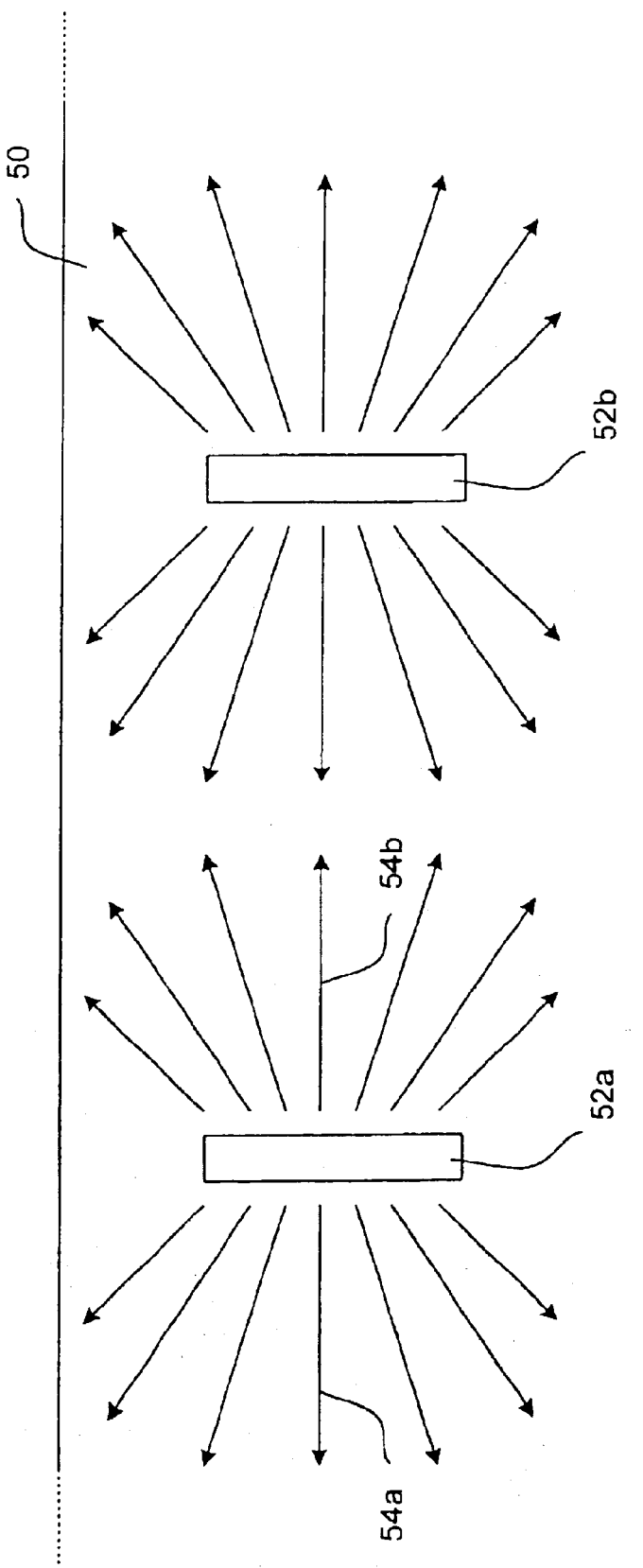
FIG. 5 is a schematic view of a boat hull having a number of boat lights, each directing light rays in forward and backward direction.

In the illustrative embodiment, each of the boat lights 36a, 36b, 36c and 36d includes at least one light source for producing a number of light rays and an elongated carrier for carrying the at least one light sources. The elongated carrier is preferably adapted for directing the light rays down to the boat hull 32 along a longitudinally extending axis, wherein the longitudinally extending axis has a length that is substantially longer than the width of the carrier, as shown. FIGS. 3–5 below show a number of illustrative placements for the lights of, for example, FIGS. 2, 6–12, 18–31, and 35–48.

It is also contemplated that when the upper deck 31 includes one or more relatively vertically extending surfaces, additional boat lights 38 may be provided to illuminate these side surfaces as well. This may even further increase the visibility of the boat 30.

FIG. 3 is a schematic view of a boat hull having a number of boat lights, each directing light rays in a downward direction. While rectangular shaped boat lights are shown, it is contemplated that the boat lights may assume any desired shape. A hull is illustrated at 40 with a number of boat lights 40a, 40b, 40c and 40d mounted thereto. Boat lights 40a and 40b are shown mounted near the top of hull 40 and provide light rays in a generally downward direction. Boat lights 40c and 40d are shown mounted in an intermediate location on hull 40, and also provide light rays in a generally downward direction.

It is recognized that only the upper row of boat lights 40a and 40b may be necessary to illuminate the boat hull 40 down to the expected water line. Some hull designs may curve significantly inward toward the expected water line. For these boat hulls, it has been found that water at the water line of the boat may reflect some of the light provided by the upper row of boat lights 40a and 40b toward the hull of the boat. In some embodiments, one or more lower rows of boat lights, such as boat lights 40c and 40d, may be provided to help illuminate the lower portion of the boat hull 40, if desired.

FIG. 4 is a schematic view of a boat hull having a number of boat lights, each directing light rays in an upward direction. A hull is illustrated at 46 with a number of boat lights 48a and 48b mounted thereto. Boat lights 48a and 48b are shown mounted on a lower portion of hull 46, and provide light rays in a generally upward direction.

FIG. 5 is a schematic view of a boat hull having a number of boat lights, each directing light rays in forward and backward direction. A hull is illustrated at 50 with a number of boat lights 52a and 52b mounted thereto. Boat lights 52a and 52b are shown mounted on the hull 50, and may provide light rays in either a forward direction, a backward direction, or both. For example, boat light 52a may provide light rays 54a in a generally backward direction, light rays 54b in a generally forward direction, or both.

Figure 6:
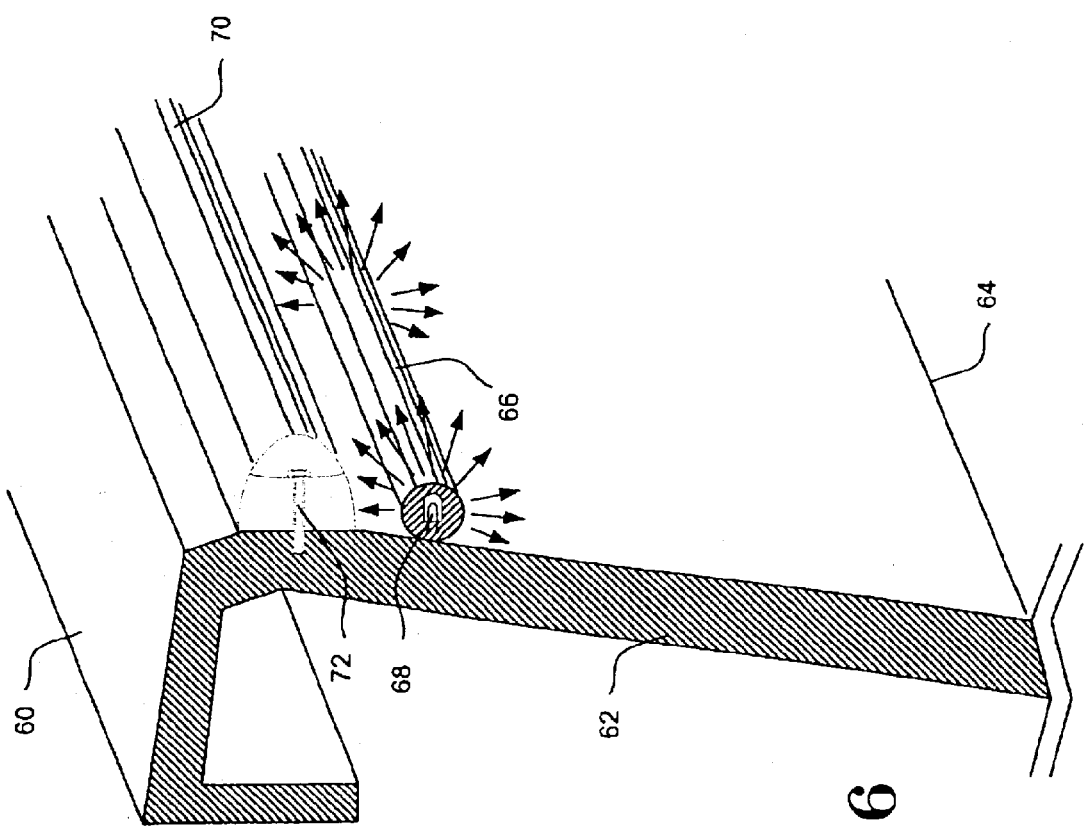
FIG. 6 is a partial cross-sectional perspective view of a boat hull having an illustrative elongated light apparatus.

FIG. 6 is a partial cross-sectional perspective view of a boat hull 60 having an illustrative elongated boat lighting apparatus 66. The boat hull 60 includes a generally downward extending portion 62 that extends to an expected water line 64. The boat hull 60 may also include a bumper assembly 70 for protecting the boat hull 60 from docks or the like. The bumper assembly 70 is shown mounted on a top portion of the downward extending portion 62 of the boat hull 60 via mounting bolt 72.

The elongated boat lighting apparatus 66 is shown mounted to the downward extending portion 62 just below the bumper assembly 70. The elongated boat lighting apparatus 66 includes at least one light source for producing a number of light rays as shown, and an elongated carrier for carrying the at least one light source. The elongated carrier is preferably at least partially transparent to allow the light rays produced by the one or more light source to exit the carrier. In the embodiment shown, the light rays exit the carrier in various directions including down to the downward extending portion 62 of the boat hull 60, horizontally away from the boat hull 60, and upward toward the bumper assembly 70. However, in some embodiments, a redirector (not shown) may be positioned adjacent the top and outer side of the carrier to redirect substantially all of the light rays to the downward extending portion 62 of the boat hull 60. The redirector may include, for example, a separate shield placed around the top and outer side of the carrier, a reflective coating positioned on the top and outer side surface of the carrier, or portions of the carrier may be made non-transparent. Alternatively, or in addition, the elongated boat lighting apparatus 66 may be incorporated into the bumper assembly 70, similar to that shown in FIG. 9.

It is contemplated that the one or more light sources 88 (as well as the other light sources referenced throughout the drawings) may be any type of light source including an incandescent light source, a fluorescent light source, a light emitting diode (LED), any type of laser including one or more vertical cavity surface emitting lasers (VCSEL), a phosphor material, a glow in the dark material, or any other type of light source, either active or passive, that is capable of producing visible light.

In some embodiments, the one or more light sources may include an elongated light source, such as an electro-luminescent wire. One such electro-luminescent wire is commercially available from Solution Industries, located in Cypress, Tex., under the Trademark Flex Wire®. Another such electro-luminescent wire is commercially available from ELAM Electro-luminescent Industries Ltd., located in Jerusalem, Israel, under the Trademark LyTec™. Alternatively, or in addition, the one or more light sources may be a string of light sources, such as a string of incandescent light sources. One such string of light sources is available from Light Tech, Inc., located in Grand Rapids, Mich.

It is also contemplated the one or more light sources may include a light guide, such as a solid or multi-strand fiber optic cable or any other type of light transmitting medium that can transmit light rays. When so provided, the actual source of light may be located remotely, if desired, and coupled to the fiber optic cable or other type of light transmitting medium that can deliver the light rays to the desired location. One particularly suitable fiber optic cable is a linear emitting fiber, which emits light out of the side of the fiber. One such linear emitting fiber is available from Lumenyte International Corporation, Irvine, Calif., under the Trademark STA-FLEX® LEF™ Linear Emitting Fiber. More information on Linear Emitting Fibers can be found in, for example, U.S. Pat. Nos. 6,289,150, 6,282,355, 6,251,311, 5,987,199, 5,937,127, 5,903,695, RE36,157, all of which are incorporated herein by reference. Traditional fiber optical cable may also be used, if desired.

It is contemplated that in some embodiments, the light source may include a UV stabilizer, UV absorber and/or UV filter. For example, some commercially available electro-luminescent wires include a polymer coating or sleeve over the electro-luminescent material. It is contemplated that the polymer coating or sleeve may include a UV stabilizer, UV absorber and/or UV filter to help limit the deterioration of the polymer coating and/or electro-luminescent material. A preferred UV absorber is Sanduvor PR-25, available from Clariant Corp., Charlotte, N.C., which operates using photoreactive chemistry. However, other UV stabilizers, UV absorbers, and UV filters maybe used, as desired.

Figure 7:
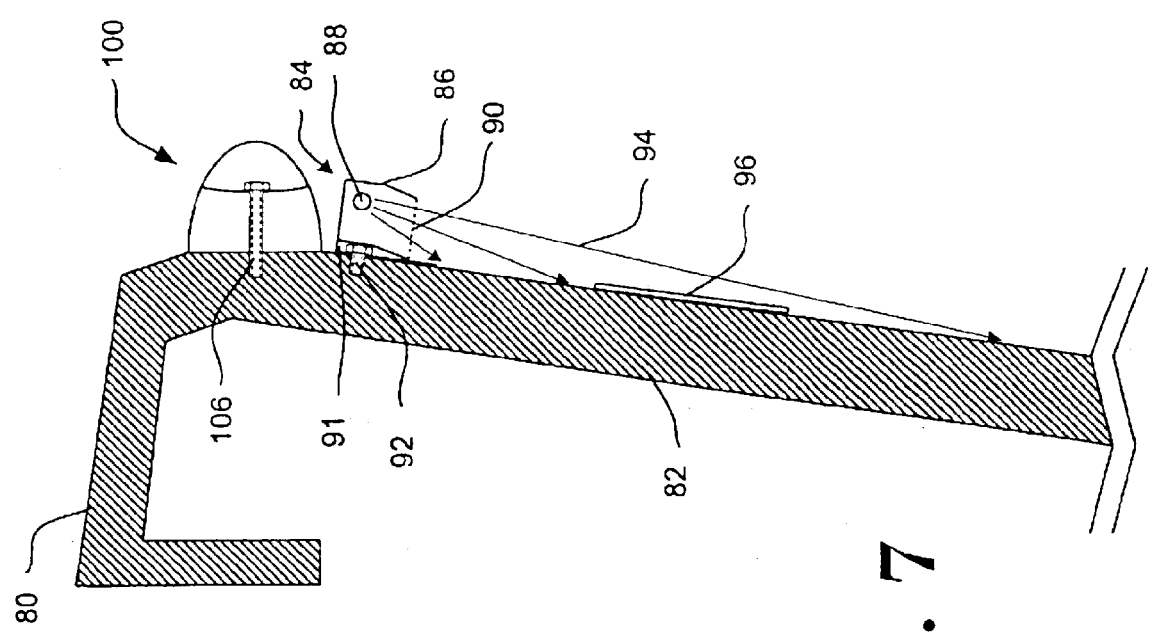
FIG. 7 is a partial cross-sectional side view of a boat hull having another illustrative boat lighting apparatus.

FIG. 7 is a partial cross-sectional side view of a boat hull having another illustrative boat lighting apparatus. The boat hull 80 includes a generally downward extending portion 82 that extends to an expected water line. The boat hull 80 may also include a bumper assembly 100 for protecting the boat hull 80 from docks or the like. The bumper assembly 100 is shown mounted on a top portion of the downward extending portion 82 of the boat hull 80 via mounting bolt 106.

In the illustrative embodiment, boat lighting apparatus 84 is mounted to the downward extending portion 82, just below the bumper assembly 100. The boat lighting apparatus 84 includes one or more light sources 88 for providing light rays, a housing 86 for carrying the light source 88, and a mount 91 for mounting the housing 86 to the boat. The mount 91 is shown bolted to the side of the downward extending portion 82 of the hull via a bolt or screw 92. It is contemplated, however, that any number of means may be used to attach the mount to the boat including an adhesive or the like.

The housing 86 preferably has at least one opening 90 for directing the light rays 94 to at least a portion of the hull of the boat. In the illustrative embodiment shown, the housing 86 includes a wall that extends around three sides of the light source 88, leaving the one opening 90 on the fourth downward side. Such a configuration not only helps direct the light rays 94 toward the hull of the boat, but also helps prevent at least a portion of the light rays from traveling laterally away from the hull of the boat. The inside surface of the housing 86 may be reflective, and may be shaped to help redirect the light rays 94 in a downward direction toward the hull of the boat. The housing 86 may also include a bracket (not shown) for carrying the one or more light sources 88.

A transparent or semi-transparent plate may be positioned across the opening 90. The transparent or semi-transparent plate may be constructed as a lens or the like to help redirect and/or focus the light on the hull of the boat. It is also contemplated that the transparent or semi-transparent plate may include a pattern provided thereon or therein to cause an image to be projected onto the hull of the boat. Finally, the transparent or semi-transparent plate may help protect the one or more light sources 88 from water or other undesirable environmental conditions.

In some embodiments, the transparent or semi-transparent plate may include a UV stabilizer, UV absorber and/or UV filter. The remainder of the housing 86 may also include a UV stabilizer, UV absorber and/or UV filter. This may help prevent deterioration of the transparent or semi-transparent plate and/or housing 86, and may limit the amount of UV radiation that engages the one or more light sources. This may help extend the life of the light assembly, especially when exposed to sun light. It is contemplated that UV stabilizers, UV absorbers and/or UV filters may be applied to the carriers, housings, light sources, and other parts of the various embodiments disclosed herein, as desired.

To enhance the illumination of the hull of the boat, it is contemplated that a reflective medium 96 may be provided in or on the outer surface of the boat as shown. The reflective medium preferably helps reflect the light rays 94 laterally outward and away from the hull of the boat to enhance the visibility of the boat. It is contemplated that the reflective medium may be patterned to form an image. The image may be, for example, the name of the boat, advertising logos or any other desired image.

FIG. 8 is a perspective view of another illustrative boat lighting apparatus in accordance with the present invention. This illustrative boat lighting apparatus includes a round housing 120 that has an outer plate 122 and an inner plate 124. The inner plate 124 is preferably positioned adjacent the boat hull when installed, and includes a hole 128 for receiving wires or the like to power a local light source. While a round housing is shown, it is contemplated that the housing 120 may be any shape.

A side plate 126 extends around part of the perimeter of the outer plate 122 and the inner plate 124. In the embodiment shown, the side plate 126 extends around the perimeter of about the upper half of the outer plate 122 and inner plate 124, leaving the perimeter around the lower half open. A light source (not shown) is preferably provided the space between the outer plate 122 and the inner plate 124. In this configuration, the outer plate 122, inner plate 124 and side plate 126 help redirect the light rays provided by the light source downward through the opening toward the hull of the boat.

A transparent or semi-transparent plate 130 may extends around the lower perimeter of the outer plate 122 and the inner plate 124. The transparent or semi-transparent plate 130 helps protect the light source from water and other undesirable environmental conditions. It is contemplated that the transparent or semi-transparent plate may be configured as a lens or the like to help focus or redirect the light rays to the hull of the boat. One such transparent or semi-transparent plate is illustrated at 132, and has an outer surface 134 that tapers inward toward the boat. Because the lens is thicker away from the boat, the light rays traveling parallel to the hull of the boat are refracted more than those light rays that are already traveling toward the hull of the boat. This may help increase the illumination of the hull of the boat.

Figure 9:
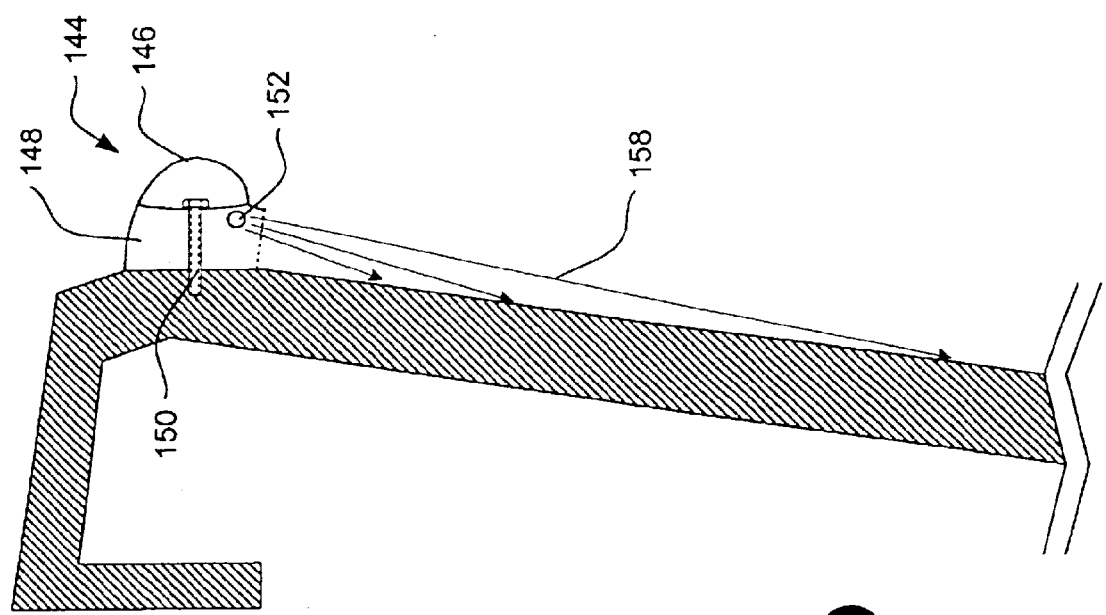
FIG. 9 is a partial cross-sectional side view of a boat hull having a boat lighting apparatus incorporated into a side bumper assembly.

FIG. 9 is a partial cross-sectional side view of a boat hull with yet another boat lighting apparatus. This embodiment is similar to that shown in FIG. 7, but has the boat lighting apparatus integrated or incorporated into the bumper assembly 144. The bumper assembly 144 includes a flexible bumper guard 146 attached to an elongated housing 148. The elongated housing 148 is attached to the hull of the boat via a bolt or screw 150. The elongated housing 148 preferably has a cavity therein for receiving one or more light sources 152. The cavity is preferably open along the lower surface thereof to allow the light rays 158 to illuminate the hull of the boat.

Figure 10:
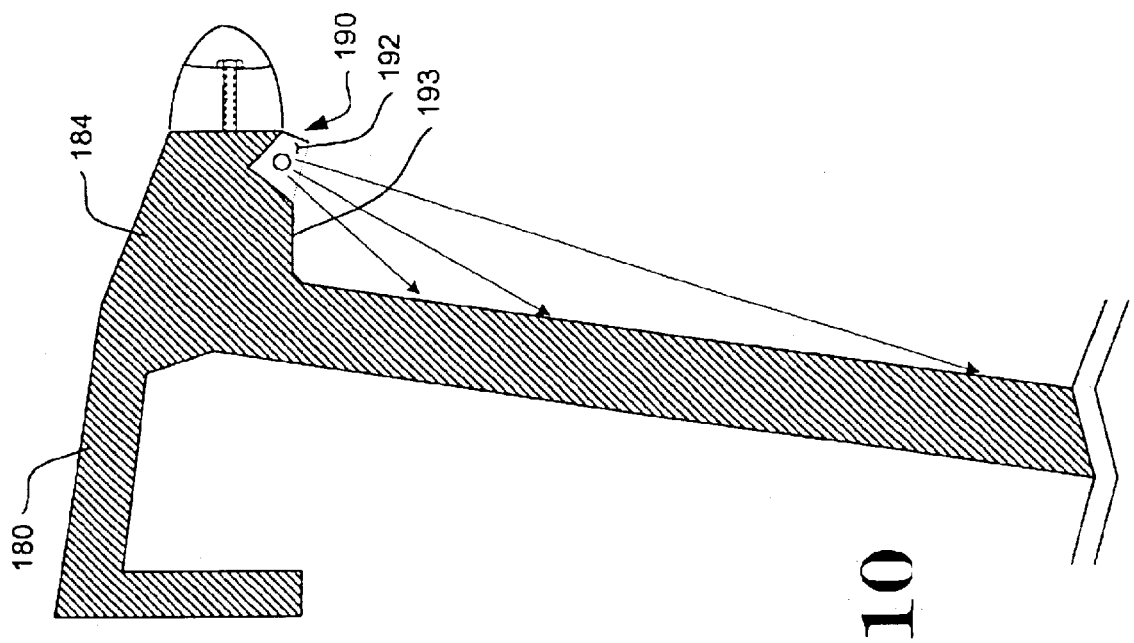
FIG. 10 is a partial cross-sectional side view of a boat hull having a boat lighting apparatus incorporated into an outward extending hull portion.

FIG. 10 is a partial cross-sectional side view of a boat hull having a boat lighting apparatus incorporated into an outward extending hull portion. In this embodiment, the boat hull 180 includes an outward extending hull portion 184. The boat lighting apparatus 190 may then be provided in a cavity 192 provided in the lower surface of the outward extending hull portion 184. Alternatively, a boat lighting apparatus similar to that shown in FIG. 7, for example, may be mounted to a lower surface 193 of the outward extending hull portion 184 to illuminate the hull of the boat.

Figure 11:
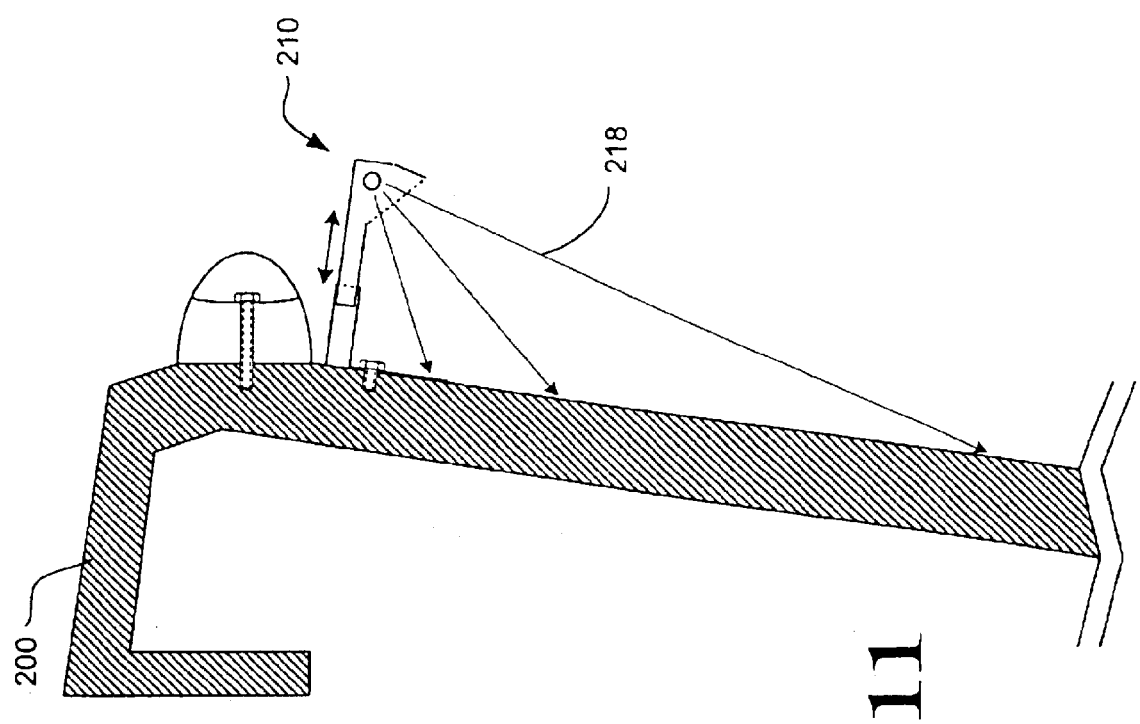
FIG. 11 is a partial cross-sectional side view of a boat hull having a telescoping boat lighting apparatus.

FIG. 11 is a partial cross-sectional side view of a boat hull having a telescoping boat lighting apparatus. In this embodiment, the boat lighting apparatus 210 has a housing that includes a telescoping lever for allowing the light source to be selectively pulled laterally away from the boat. When extended, the light source is further away from the boat hull, thereby increasing the angle of incidence of the light rays 218 at the hull of the boat. By increasing the angle of incidence, the amount of light that is reflected laterally away from the boat may be increased, thereby increasing the visibility of the hull. When contracted, the boat lighting apparatus 210 is preferably safely out of the way to reduce the chance that the boat lighting apparatus 210 will become damaged by other boats, docks or the like.

Figure 12:
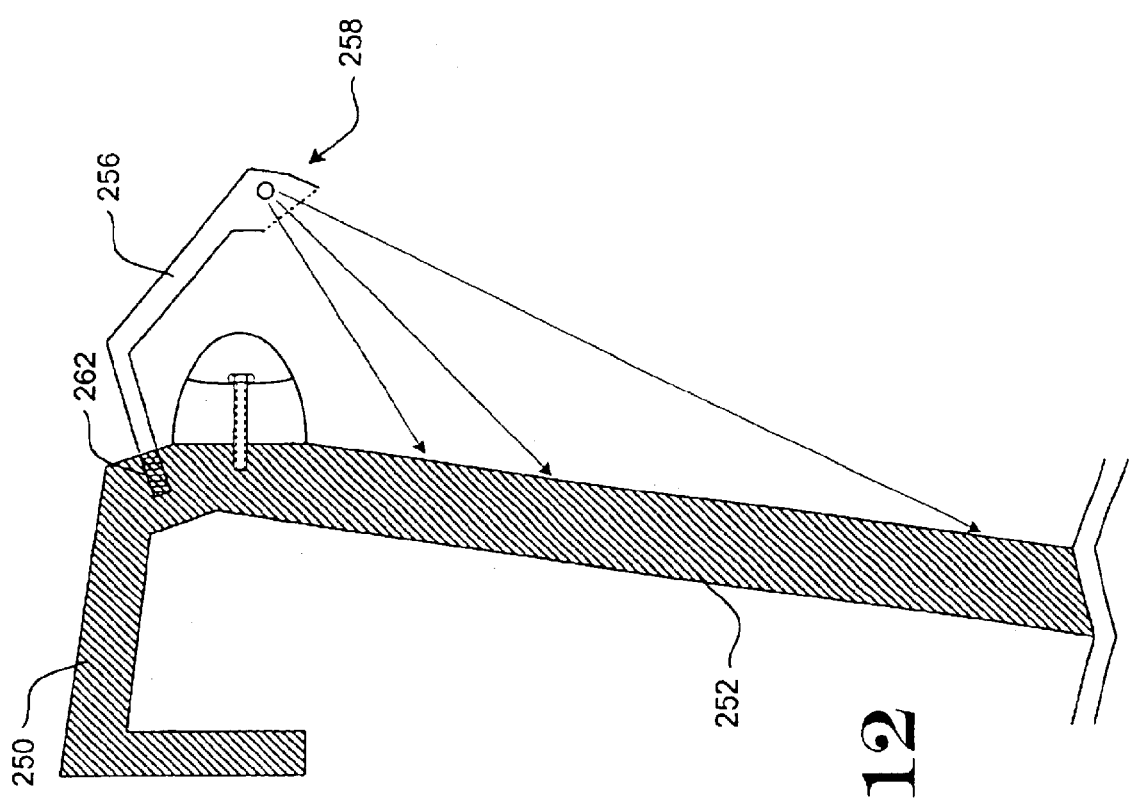
FIG. 12 is a partial cross-sectional side view of a boat hull having a threaded boat lighting apparatus.

FIG. 12 is a partial cross-sectional side view of a boat hull having a threaded boat lighting apparatus. In this embodiment, the boat lighting apparatus 258 includes a threaded end 262. The threaded end 262 preferably is adapted to engage a threaded hole in the hull of the boat. This allows the boat lighting apparatus 258 to be easily removed from the hull of the boat during, for example, daylight hours. In the illustrative embodiment, the boat lighting apparatus 258 is mounted near the top of the hull 250 so that boater inside the boat can easily remove the lights. In this configuration, a laterally extending portion 256 may be provided to extend the light source a sufficient distance away from the boat hull to adequately illuminate the hull of the boat. While the boat lighting apparatus 258 is shown mounted near the top of the hull 250, it is contemplated that the boat lighting apparatus 258 may be mounted anywhere on the boat, including further down on the downward extending portion 252.

Figure 13:
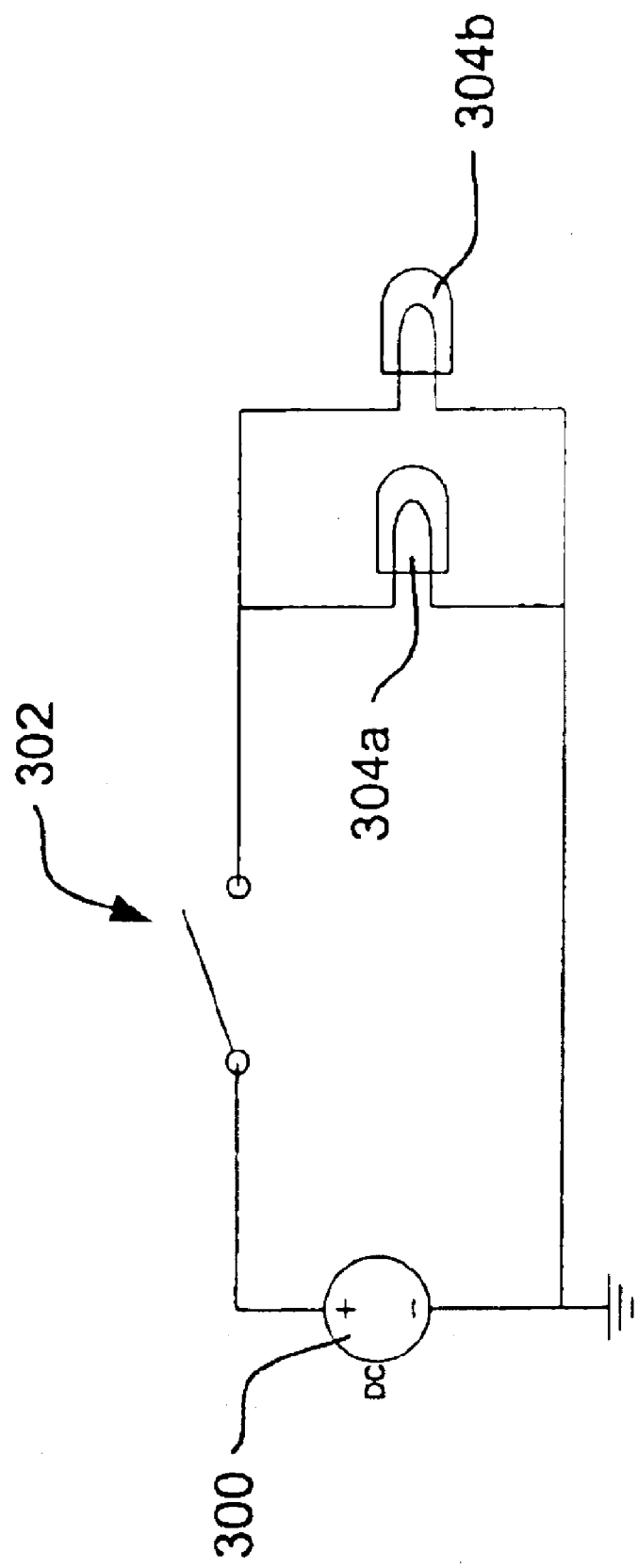
FIG. 13 is a schematic view of an illustrative circuit for powering the one or more light sources of the present invention.

FIG. 13 is a schematic view of an illustrative circuit for powering the one or more light sources of the present invention. In the embodiment shown, a power source 300 is coupled to one or more light sources 304a and 304b via switch 302. The one or more light sources 304a and 304b are preferably coupled in a parallel configuration with power source 300, as shown. This allows each light source 304a and 304b to continue to operate even when one or more of the remaining light sources burns out or otherwise becomes damaged. The power source 300 may be any type of power source, but preferably is the boat battery, the boat alternator, or any other type of power source that is capable of properly driving the one or more light sources 304a and 304b.

Figure 14:
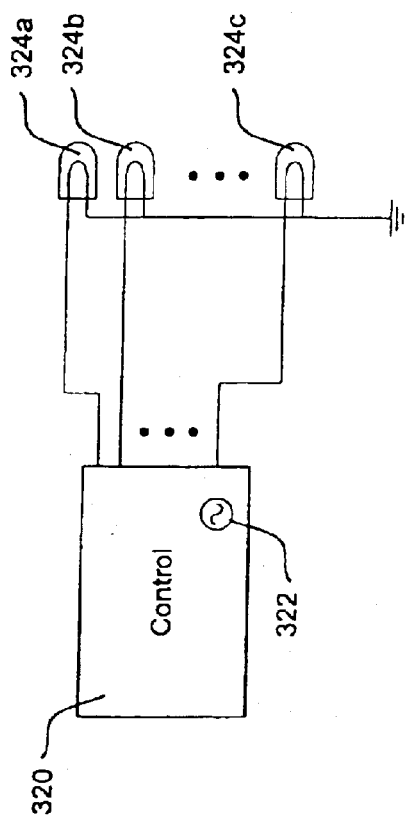
FIG. 14 is a schematic view of another illustrative circuit for powering the one or more light sources of the present invention.

FIG. 14 is a schematic view of another illustrative circuit for powering the one or more light sources of the present invention. In this embodiment, an electronic control circuit 320 provides power to each of a number of light sources 324a, 324b and 324c. The electronic control circuit receives power from a power source 322, and may be any type of control circuit that provides the desired functionality. Preferably, the control circuit is a simple state machine, a microprocessor, or any other type of control circuit.

Figure 15:
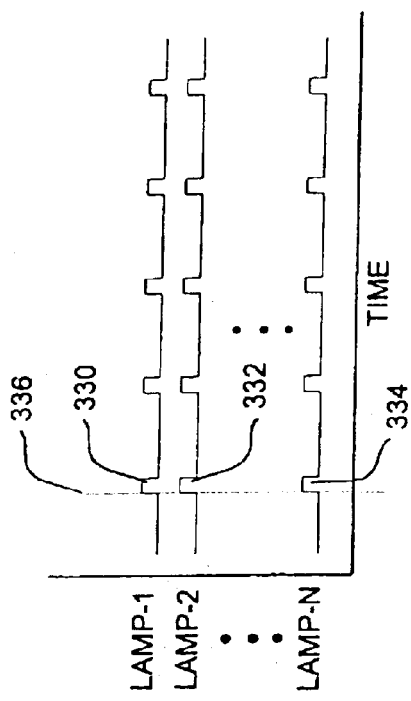
FIG. 15 is a timing diagram showing one illustrative energizing scheme provided by the control block of FIG. 14.

FIG. 15 is a timing diagram showing one illustrative energizing scheme that can be provided by the control circuit 320 of FIG. 14. In this illustrative embodiment, the control circuit 320 simultaneously provides energizing pulses 330, 332 and 334 to light sources 324a, 324b and 324c, respectively, for example at time 336. Each of the energizing pulses 330, 332 and 334 has the same duration. Accordingly, this causes each of the light sources 324a, 324b and 324c to blink "on" during the corresponding energizing pulse, and "off" after the energizing pulse terminates. After a time period, all of the light sources 324a, 324b and 324c are again energized. This causes each of the light sources 324a, 324b and 324c to simultaneously blink "on" and "off". It is believed that a blinking light may increase the visibility of the hull, especially for inattentive boaters.

Figure 16:
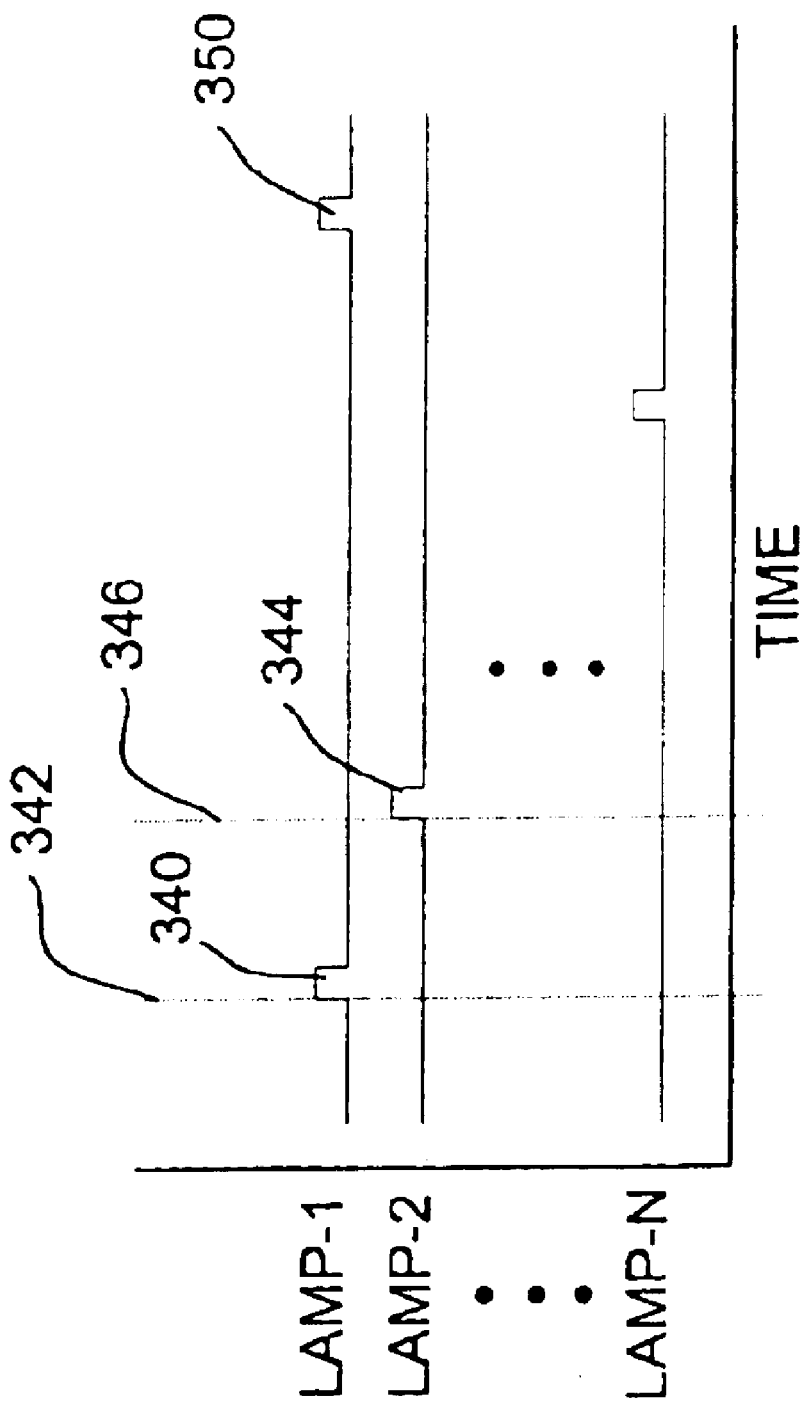
FIG. 16 is a timing diagram showing another illustrative energizing scheme provided by the control block of FIG. 14.

FIG. 16 is a timing diagram showing another illustrative energizing scheme that can be provided by the control circuit 320 of FIG. 14. In this illustrative embodiment, each of the light sources is energized in a sequential manner. For example, light source 324a is energized by energizing pulse 340 at time 342. Later, light source 324b is energized by energizing pulse 344 at time 346. Finally, light source 324c is energized. This sequence may be repeated. In a preferred embodiment, the light sources 324a, 324b and 324c are spaced longitudinally along the length of the boat. By illuminating the light sources in sequence, a moving or sweeping pattern may be generated across the hull of the boat. This may further increase the visibility of the hull of the boat. It is recognized that the embodiments shown in FIGS. 14–16 are only illustrative, and that numerous other lighting sequences can be used.

Figure 17:
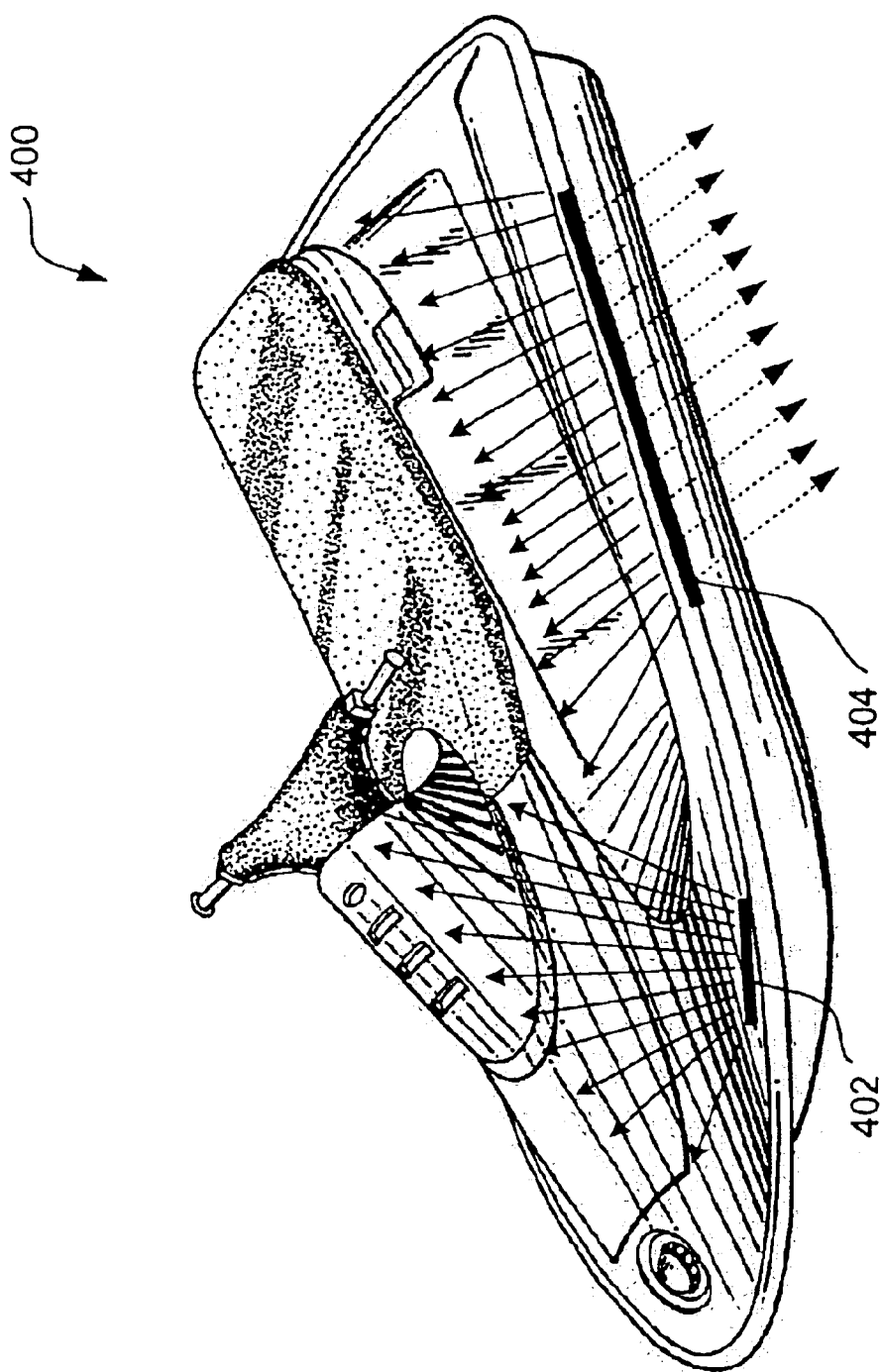
FIG. 17 is a perspective view of a personal watercraft having a boat lighting apparatus mounted thereto.

FIG. 17 is a perspective view of a personal watercraft having one or more boat lights 402 and 404 mounted thereto. Boat lights 402 and 404 are preferably similar to that described herein and preferably illuminate at least a portion of the side surfaces of the personal watercraft. While a personal watercraft is shown in FIG. 17, it is contemplated that the boat lighting apparatus of the present invention may be used to light the side surfaces of airplanes, snowmobiles, automobiles, all terrain vehicles, or any other type of "vehicle" as that term is used in the most general sense, to increase their visibility to outside observers.

Figure 18:
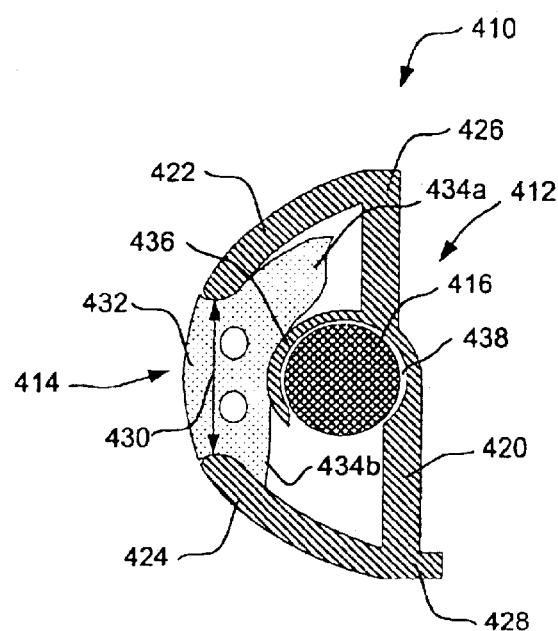
FIG. 18 is a cross-sectional side view of an illustrative lighting apparatus that includes a bumper member.

FIG. 18 is a cross-sectional side view of another illustrative lighting apparatus of the present invention. The illustrative lighting apparatus is generally shown at 410, and includes a carrier 412, a bumper member 414, and a light source 416. The carrier 412 includes a back support 420, a top support 422 and a bottom support 424, as shown.

The terms "back", "bottom" and "top" are only used herein as relative terms to help describe the Figures. They are not intended to imply that the bottom support 420 must be below the top support 422 when the carrier 412 is actually mounted to an object. The top support 422 and bottom support 424 are shown extending from the top 426 and bottom 428 ends, respectively, of the back support 420 in a leftward direction. The top support 422 and bottom support 424 terminate to define a gap or slot 430 therebetween.

The bumper member 414 is shown positioned in the gap or slot 430. The bumper member 414 preferably has an outer facing portion 432 that is sized to fit into the slot 430, and one or more inner facing legs 434a and 434b that extend into the cavity formed by the top support 422 and bottom support 424 of the carrier 412. The one or more legs 434a and 434b preferably have a dimension that exceeds the lateral dimension of the slot 430, which helps secure the bumper member 414 to the carrier 412. In some embodiments, the bumper member 414 and/or carrier 412 are at least somewhat deformable, so that the bumper member 414 and/or the elongated carrier 412 can or must be elastically deformed (e.g. bent or otherwise deformed) to allow the one or more legs 434a and 434b of the bumper member 414 to slip through the slot 430. The bumper member 414 may also have one or more holes or lumens 440a and 440b. These holes or lumens 440a and 440b may decrease the rigidness of the bumper member 414, as desired.

In one illustrative embodiment, the back support 420, top support 422 and bottom support 424 of the carrier 412 are integrally formed by extrusion, although this is not required. In some embodiments, the back support 420, top support 422 and bottom support 424 of the carrier 412 are made from a relatively rigid material, such as Vinyl, PVC, aluminum, or any other suitable material.

The bumper member 414 may also be formed by extruding a material such as Vinyl, PVC, rubber, or any other suitable material. However, like above, this is not required. Preferably, the bumper member 414 is formed from a softer material than the carrier 412, but this is also not required.

In the illustrative embodiment shown in FIG. 18, the carrier 412 has an inner support member 436 that is curved to form a light receiving opening or cavity 438. In the illustrative embodiment, the inner support member 436 is adapted to receive and secure an elongated light source 416. In a preferred embodiment, the elongated light source 416 is an electro-luminescent wire or a Linear emitting fiber, as detailed above. However, it is contemplated that the elongated light source 416 may be any type of light source, including those discussed above.

The inner support member 436 may be at least partially transparent or non-transparent. When the inner support member 436 is non-transparent, the light emitted by the light source is directed in a downward direction toward the bottom support 424 of the carrier 412. When so provided, at least a portion of the bottom support 424 is preferably at least partially transparent. This may be accomplished by, for example, forming the bottom support 424 or a portion thereof from a material that is at least semi-transparent. Alternatively, holes or slots may be provided in the bottom support 424 to allow the light to pass through the bottom support 424. In some embodiments, the holes or slots may be spaced holes or slots that are spaced along the length of the bottom support 424. Such spaced holes or slots may be formed by, for example, periodically interrupting the extrusion material along the bottom support 424. Other methods may also be used, such as cutting, drilling or otherwise forming spaced holes or slots. Spaced holes or slots may be used in other embodiments described herein, if desired.

In some embodiments, the back support 420, top support 422 and bottom support 424 may be formed from a transparent or semi-transparent material. In other embodiments, only selected portions may be formed from a transparent or semi-transparent material. For example, the bottom support 424, or portion thereof, may be formed from a transparent or semi-transparent material. In this latter case, the back support 420, top support 422 and bottom support 424 may be co-extruded using a non-transparent and transparent or semi-transparent material, with the transparent or semi-transparent material corresponding to the portion that is to transmit light. Alternatively, the bottom support 424, or the portion thereof that is to pass light, may be separately formed and subsequently attached, if desired.

In another illustrative embodiment, the inner support member 436 or a portion thereof may be made from a transparent or semi-transparent material to pass light toward the bumper member 414. In this illustrative embodiment, the bumper member 414, or a portion thereof, may also be formed from a transparent or semi-transparent material. When so provided, the light from the light source 416 may pass through the inner support member 436, through the bumper member 414, and away from the carrier 412. In use, the back support 420 is preferably positioned adjacent a mounting surface and mounted thereto.

It is contemplated that the bumper member 414 and/or carrier 412, or parts thereof, may be made using materials of different colors, as desired. Also, it is contemplated that the light source may be selected to produce a desired color of light.

Figure 19:
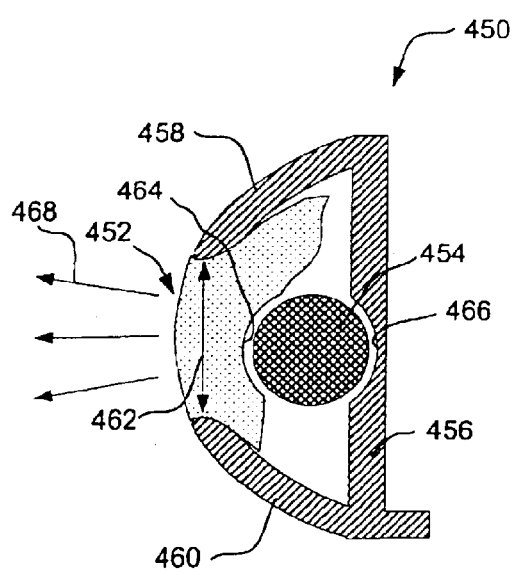
FIG. 19 is a cross-sectional side view of an illustrative lighting apparatus that includes a bumper member, wherein at least a portion of the bumper member is adapted to transmit light.

FIG. 19 is a cross-sectional side view of another illustrative lighting apparatus of the present invention. The illustrative lighting apparatus includes a carrier 450, a bumper member 452, and a light source 454. The carrier 450 includes a back support 456, a top support 458 and a bottom support 460, as shown. The top support 458 and bottom support 460 are shown extending from the top and bottom ends, respectively, of the back support 456 in a leftward direction. The top support 458 and bottom support 460 terminate to define a gap or slot 462 therebetween.

The bumper member 452 is shown positioned in the gap or slot 462, as described above. In the illustrative embodiment, the back surface 464 of the bumper member 452 and the front surface 466 of the back support 456 are shaped to form a light receiving channel, opening or cavity. In the illustrative embodiment, the light receiving channel, opening or cavity is adapted to receive and secure an elongated light source 454. It is contemplated that the elongated light source 454 may be any type of light source, including those identified herein.

The bumper member 452, or a portion thereof, is preferably formed from a transparent or semi-transparent material. When so provided, the light from the light source 454 may pass through the bumper member 452, and away from the carrier 450 as shown by lines 468.

Figure 20:
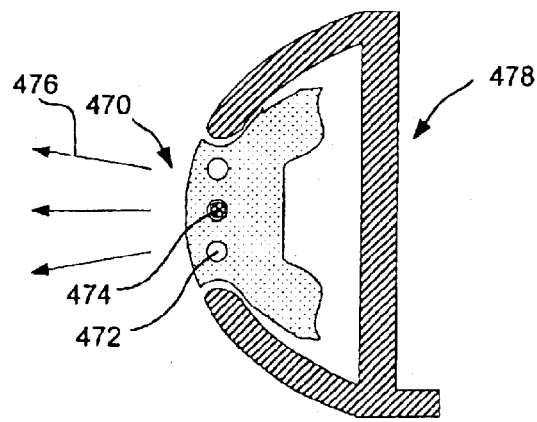
FIG. 20 is a cross-sectional side view of another illustrative lighting apparatus that includes a bumper member, wherein the bumper member is adapted to receive a light source and transmit light.

FIG. 20 is a cross-sectional side view of another illustrative lighting apparatus in accordance with the present invention. In this illustrative embodiment, the bumper member 470 includes one or more holes, slots or lumens 472. A light source 474 is then positioned in one or more of the holes, slots or lumens 472. Only one light source 474 is shown in FIG. 20. The bumper member 470, or a portion thereof, is preferably formed from a transparent or semi-transparent material. When so provided, the light from the light source 474 may pass through the transparent or semi-transparent portion of the bumper member 470 and away from the carrier 478, as shown by lines 476.

When more than one light source 474 is provided, each light source 474 may be situated in a different one of the holes or lumens 472, but this is not required. Selected light sources may be selected to produce different colors. Alternatively, or in addition, the portion of the bumper member 470 adjacent selected light sources may be formed from materials of different colors. In some embodiments, this may provide the appearance of one or more stripes of colors along the bumper member 470.

Figure 21:
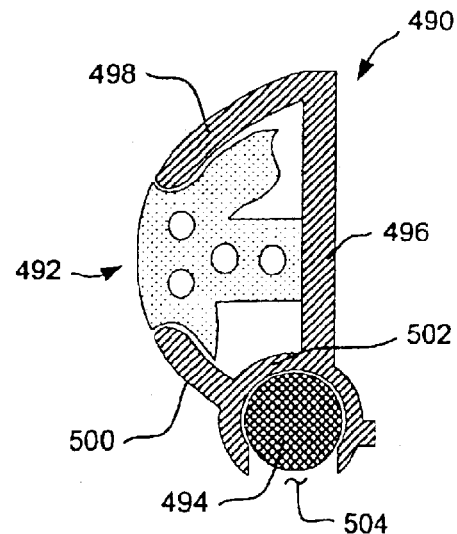
FIG. 21 is a cross-sectional side view of an illustrative lighting apparatus that includes a carrier and a bumper member, wherein the carrier is adapted to receive a light source.

FIG. 21 is a cross-sectional side view of another illustrative lighting apparatus in accordance with the present invention. In this illustrative embodiment, the lighting apparatus includes a carrier 490, a bumper member 492, and a light source 494. The carrier 490 includes a back support 496, a top support 498 and a bottom support 500, as shown. Like above, the top support 498 and bottom support 500 terminate to define a gap or slot for receiving the bumper member 492.

In some embodiments, the back support 496, top support 498 and bottom support 500 of the carrier are made from a relatively rigid material, such as Vinyl, PVC, aluminum, or any other suitable material. The bumper member 492 may also be formed by, for example, extruding a material such as Vinyl, PVC, rubber, aluminum or any other suitable material. However, like above, this is not required. Preferably, the bumper member 492 is formed from a softer material than the carrier, but this is also not required.

In the illustrative embodiment, the back support 496 and the bottom support 500 are joined together through a light carrying member 502. Although not shown in FIG. 21, it is contemplated that the back support 496 and the top support 498 may also be joined together through another light carrying member, if desired, to provide light in an upward direction. The light carrying member 502 preferably defines a channel, cavity or recess for receiving the light source 494. Preferably, the cavity or recess is sized to receive the light source and secure the light source 494 to the carrier 490. In the illustrative embodiment, the cavity or recess has a receiving slot 504 for receiving the light source 494. In a preferred embodiment, the light source 494 is an elongated light source such as an electro-luminescent wire or a Linear Emitting Fiber, as detailed above. However, it is contemplated that the light source 494 may be any type of light source, including those identified herein.

FIG. 22 is a cross-sectional side view of yet another illustrative lighting apparatus in accordance with the present invention. In this illustrative embodiment, the lighting apparatus includes a carrier 510. For simplicity, the bumper member and light source are not shown. The carrier 510 includes a back support 512, a top support 514 and a bottom support 516, as shown. Like above, the top support 514 and bottom support 516 terminate to define a gap or slot 518 for receiving a bumper member.

In the illustrative embodiment, the bottom support 516 is shaped to provide a light carrying channel, cavity or recess 518. The light carrying channel, cavity or recess 518 preferably is sized to receive a light source. In the illustrative embodiment, the channel, cavity or recess 518 preferably has a transparent or semi-transparent portion 520 for passing light in a downward direction. The transparent or semi-transparent portion 520 may be co-extruded with the rest of the carrier 510, which may be made from a non-transparent material, if desired. Alternatively, the transparent or semi-transparent portion 520 may be formed separately, and subsequently secured to the bottom support 516.

In either case, and in some embodiments, the transparent or semi-transparent portion 520 may be shaped to form a Fresnel lens, as shown in FIG. 24. A Fresnel lens may help collect and focus the light that is emitted by the light source. A Fresnel lens may also help minimize the amount of absorption in the lens by reducing the thickness of the lens. Other lens shapes may also be used.

FIG. 23 is a cross-sectional side view of yet another illustrative lighting apparatus in accordance with the present invention. This illustrative embodiment is similar to the embodiment shown in FIG. 22. However, the bottom support 530 is shaped to provide a larger cavity 532 for receiving a bumper member. Further, the wall thickness of the bottom support 530 is maintained along its length. In the illustrative embodiment, this is accomplished by moving the central axis 536 of the light carrying cavity or recess 534 further down and/or away from the carrier.

Figure 25:
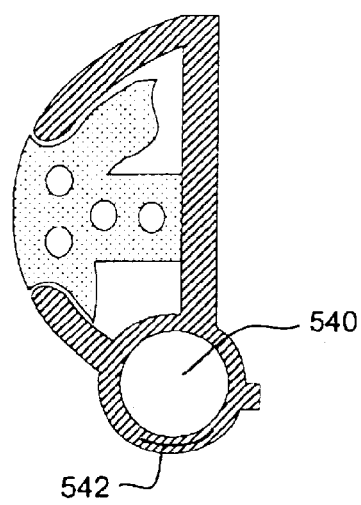
FIG. 25 is a cross-sectional side view of another illustrative lighting apparatus that includes a carrier that is adapted to receive a light source.

FIG. 25 is a cross-sectional side view of another illustrative lighting apparatus in accordance with the present invention. This illustrative embodiment is similar to the embodiment shown in FIG. 21. However, the cavity or recess 540 does not have a receiving slot for receiving the light source 494. Instead, a wall encircles the cavity or recess 540. In one embodiment, a lower portion 542 of the wall encircling the cavity or recess 540 is formed from a transparent or semi-transparent material. The remainder of the wall encircling the cavity or recess 540 may be at least partially reflective, but this is not required.

Figure 26:
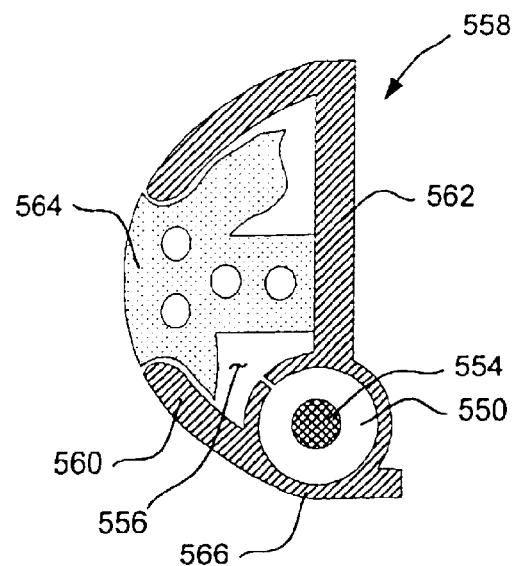
FIG. 26 is a cross-sectional side view of another illustrative lighting apparatus that includes a carrier that is adapted to receive a light source.

FIG. 26 is a cross-sectional side view of another illustrative lighting apparatus in accordance with the present invention. This illustrative embodiment is similar to that shown in FIG. 25. However, the cavity or recess 550 has a receiving slot 552 for receiving a light source 554. The receiving slot 552 is shown opening into the inner cavity 556 of the carrier 558. To install the light source 554 into the cavity or recess 550, the bottom support 560 may be pulled away from the back support 562. Preferably, the bottom support 560 and/or back support 562 temporarily elastically deform to open the receiving slot 552 and receive the light source 554. Once the light source 554 is in the cavity or recess 550, the bottom support 560 may be returned or nearly returned to its original position relative to the back support 562. The bumper member 564 is then installed, also preferably by elastic deformation of the bumper member 564 and/or carrier 558. Like the embodiment shown in FIG. 25, it is contemplated that a lower portion 566 of the wall encircling the cavity or recess 550 may be formed from a transparent or semi-transparent material. The remainder of the wall encircling the cavity or recess 550 may be at least partially reflective, but this is not required.

Figure 27:
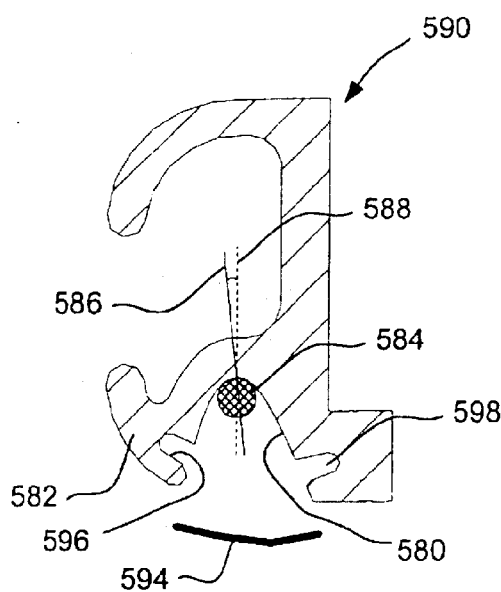
FIG. 27 is a cross-sectional side view of another illustrative lighting apparatus that includes a carrier, wherein the carrier includes a parabolic shaped recess for receiving a light source.

FIG. 27 is a cross-sectional side view of yet another illustrative lighting apparatus in accordance with the present invention. In this illustrative embodiment, a parabolic shaped recess or cavity 580 is formed in the bottom support 582. A parabolic shape may help collect and direct the light emitted by the light source 584 in a particular direction, particular if the walls of the parabolic shaped recess or cavity 580 are at least partially reflective. In some embodiments, the axis 586 of the parabolic shaped recess or cavity 580 may be offset relative to a vertical axis 588 to help direct the light rays toward an object, such as an object that the carrier 590 is mounted.

A lens or cover 594 may be provided to cover the parabolic shaped recess or cavity 580, if desired. In some illustrative embodiments, one or more receiving slots 596 and 598 may be provided for receiving the edges of the lens or cover 594. In other illustrative embodiments, the lens or cover may be co-extruded or otherwise integrally formed or securely attached to the carrier 590.

Figure 28:
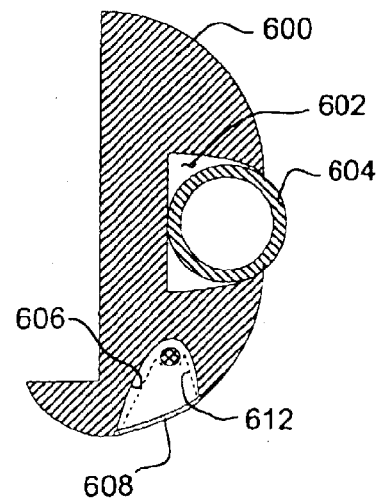
FIG. 28 is a cross-sectional side view of another illustrative lighting apparatus that includes a carrier and a bumper member, wherein the carrier includes a recess for receiving a light source.

FIG. 28 is a cross-sectional side view of another illustrative lighting apparatus in accordance with the present invention. This illustrative embodiment includes a "D" shaped carrier 600 having a bumper receiving slot 602. A bumper member 604 may be provided in the bumper receiving slot 602. The bumper member 604 may be an elongated tube that is sized to fit within the bumper receiving slot 602, as shown. Like the illustrative embodiment of FIG. 27, a parabolic shaped recess or cavity 606 is provided in a bottom portion of the "D" shaped carrier 600. A lens or cover 608 may be provided to cover the parabolic shaped recess or cavity 606, if desired. In the illustrative embodiment, the lens or cover is co-extruded or otherwise integrally formed or securely attached to the "D" shaped carrier 600, but this is not required.

A light source 610 is shown positioned in the parabolic shaped recess or cavity 606. One or more light source support members 612 may be provided to help secure the light source 610 in the parabolic shaped recess or cavity 606. In some embodiments, the one or more light source support members 612 may help secure the light source 610 at or near the focal point of the parabolic shaped recess or cavity 606.

Figure 29:
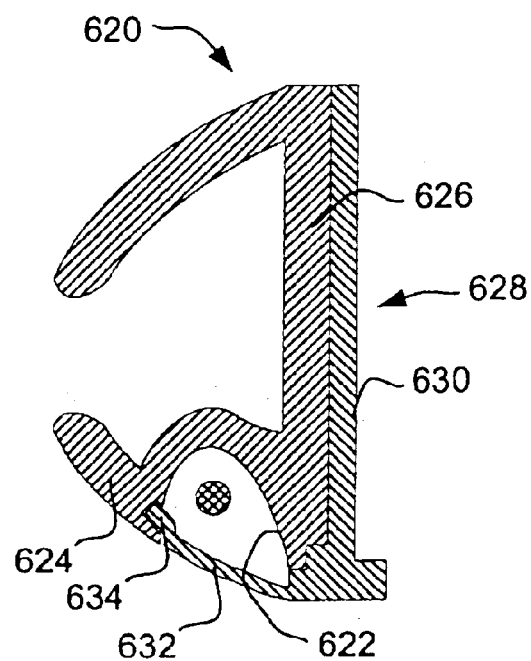
FIG. 29 is a cross-sectional side view of another illustrative lighting apparatus that includes a two piece carrier, wherein the first piece includes a recess for receiving a light source and the second piece provides a cover for the recess.

FIG. 29 is a cross-sectional side view of yet another illustrative lighting apparatus in accordance with the present invention. In this illustrative embodiment, a carrier 620 is provided with a light receiving channel, cavity or recess 622 formed in the bottom support 624. A light source 626 is positioned within the light receiving channel, cavity or recess 622. The illustrative carrier 620 has a back support 626 that is adapted to be adjacent a mounting surface.

A mating member 628 is also provided. The mating member 628 may include a back support 630 and a lens or cover portion 632. The mating member 628 preferably mates with the back support 626 of the carrier 620. The lens or cover portion 632, or a portion thereof, preferably is shaped to cover the light receiving cavity or recess 622 formed in the bottom support 624. A slot may be provided in the bottom support 624 of the carrier 620 to receive a lip 634 of the lens or cover portion 632, if desired.

In one illustrative embodiment, the carrier 620 may be made from a material that is non-transparent and at least partially reflective. The mating member 628 may be made from a material that is at least semi-transparent. Alternatively, only the lens or cover portion 632 of the mating member 628 may be made from a material that is at least semi-transparent. In other embodiments, the carrier 620 may be made from a material that is at least partially transparent, and the mating member may be made from a material that is non-transparent and at least partially reflective. In any case, it is contemplated that the mating member 628 may be made separate from the carrier 620.

Figure 30:
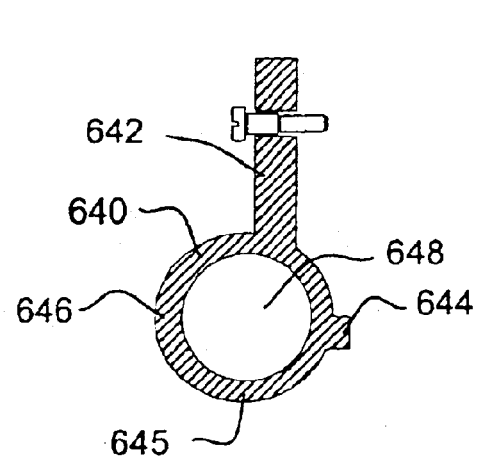
FIG. 30 is a cross-sectional side view of another illustrative lighting apparatus in accordance with the present invention.

FIG. 30 is a cross-sectional side view of another illustrative lighting apparatus in accordance with the present invention. In this illustrative embodiment, no separate bumper member is provided. Instead, an elongated tube 640 is provided with a mounting support 642 extending therefrom. A spacer support 644 may also be provided to help space the tube 640 from the mounting surface. A light source (not shown) can be positioned within the inner lumen 648 of the tube 640, as desired. At least a portion of the tube 640 is preferably at least semi-transparent to allow at least some of the light rays from the light source to exit from the tube 640. In one embodiment, portion 645, portion 646, or both, are at least semi-transparent. In some embodiments, the tube 640 is adapted to prevent light rays from traveling in a first direction away from the tube 640 while allowing light rays to travel in a second different direction away from the tube 640.

Figure 31:
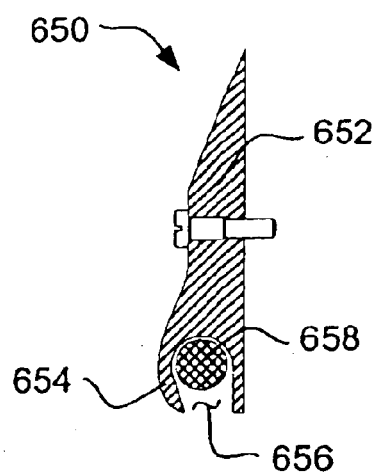
FIG. 31 is a cross-sectional side view of yet another illustrative lighting apparatus in accordance with the present invention.

FIG. 31 is a cross-sectional side view of yet another illustrative lighting apparatus in accordance with the present invention. Like the embodiment shown in FIG. 30, this illustrative embodiment also does not have a separate bumper member. Instead, an elongated member 650 is provided with a mounting region 652 and a light source receiving region 654. The light source receiving region 654 includes a light source receiving cavity or recess 656, which receives a light source 658. The elongated member 650 may be made from a non-transparent or at least semi-transparent material, as desired.

Figure 32:
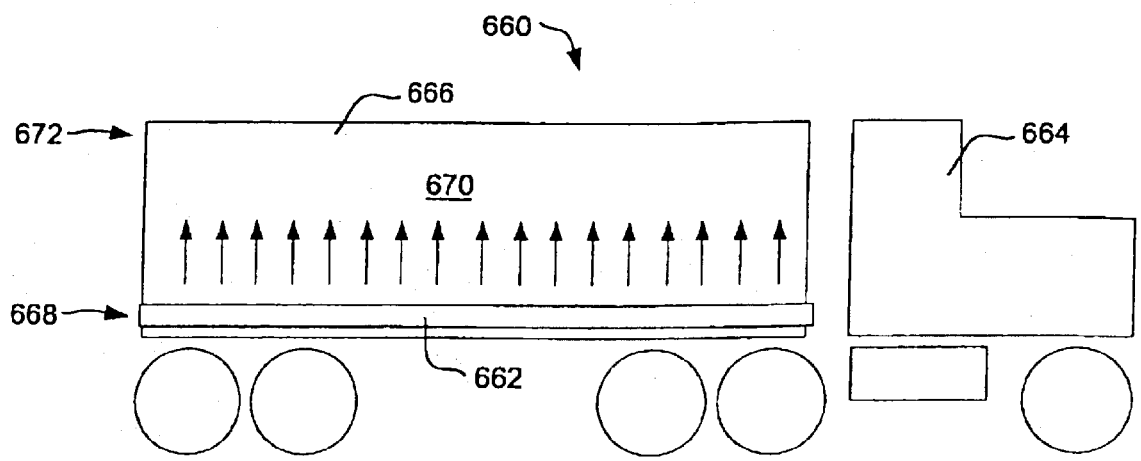
FIG. 32 is a schematic view of a truck with an illustrative lighting apparatus mounted to the side thereof.

As indicated above, it is contemplated that some embodiments of the present invention may be used to illuminate vehicles, such as boats (including barges), cars, trucks, etc., preferably by illuminating one or more side surfaces of the vehicle. The side surfaces of many vehicles provide a relatively large area that, when illuminated, can significantly increase the visibility of the vehicle, especially at night. It is believed that by providing such visibility, vehicle safety can be significantly improved. FIG. 32 is a schematic view of a truck 660 with an illustrative lighting apparatus 662 mounted to the side thereof. The illustrative truck 660 includes a cab 664 and a trailer 666, with an illustrative lighting apparatus 662 mounted along a lower edge 668 of the trailer 666. The illustrative lighting apparatus 662 may be similar to those described herein, and may distribute light in an upward direction to illuminate at least a portion of the side surface 670 of the trailer 666. The lighting apparatus 662 may extend around the perimeter of the trailer 666, if desired.

In some embodiments, the illustrative lighting apparatus 662 may include a bumper, to help provide a level of protection to the lower edge 668 of the trailer 666. Such protection may be desirable when, for example, the truck 660 is maneuvering into a loading dock or the like. While the illustrative lighting apparatus is shown mounted to a truck trailer 666, it may also be mounted to the box of a straight truck, or even to the cab 664, as desired. In addition, it is contemplated that the illustrative lighting apparatus 662 may be mounted to an upper edge 672 of the cab 664 or trailer 666, and/or at an intermediate location, as desired.

Figure 33:
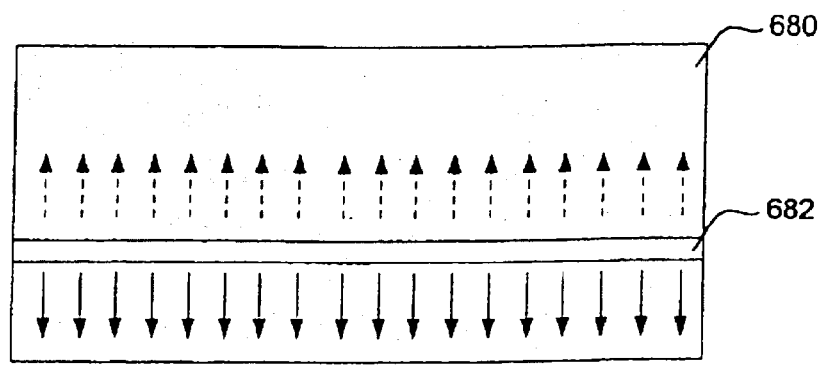
FIG. 33 is a schematic view of an object that has an illustrative lighting apparatus mounted to the side thereof.

FIG. 33 is a schematic view of an object, generally shown at 680, with an illustrative lighting apparatus 682 mounted to the side thereof. The object 680 may by any type of object. For example, the object 680 may include retail and/or store shelving and/or equipment (including grocery store shelving and/or equipment such as refrigerated shelving), bars, desks, counters, walls such as in hallways or rooms, ceilings, railings, steps, and/or any other object or surface, as desired. The illustrative lighting apparatus 682 is shown providing illumination in both an upward and downward direction, although in some embodiments, illumination may be only provided in one direction, including in an outward direction. In some embodiments, the lighting apparatus 682 may include a bumper, such as described above. When so provided, the lighting apparatus 682 may help provide a level of protection to the object 680.

Figure 34:
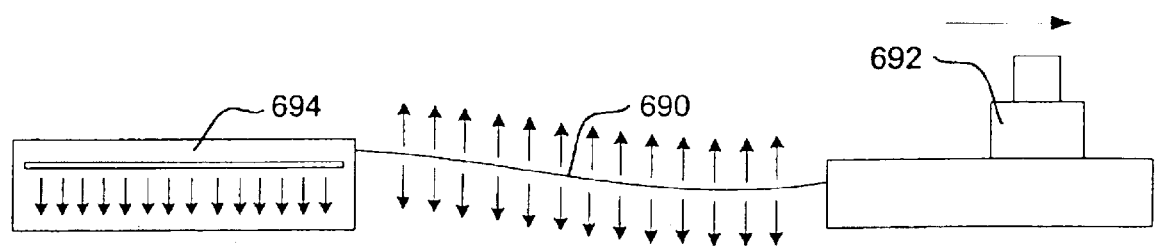
FIG. 34 is a schematic view of a tow line that includes an illustrative lighting apparatus in accordance with the present invention.

FIG. 34 is a schematic view of a tow line 690 that includes an illustrative lighting apparatus in accordance with the present invention. A tug or other boat 692 is shown pulling one or more barges 694 via tow line 690. It is contemplated that the tug boat 692, tow line 690 and/or one or more barges 694 may be illuminated using a lighting apparatus in accordance with the present invention. The tow line 690 may be illuminated by securing one or more light sources to the tow line 690. For example, an electro-luminescent wire or Linear Emitting Fiber may be secured along the length of the tow line. Other types of light sources may also be used. This may allow other boaters to more easily see the tug boat 692, the tow line 690 and/or the barges 694 at night.

It is also contemplated that one or more light sources may be provided on parked barges 694 to illuminate one or more sides surfaces of the barges 694. The one or more light sources may be incorporated into a lighting apparatus, as described herein. Barges are often fairly dark in color, and can be difficult to see at night. By illuminating one or more side surfaces of the barges 694, boaters may more easily see the parked barges at night.

Figure 35:
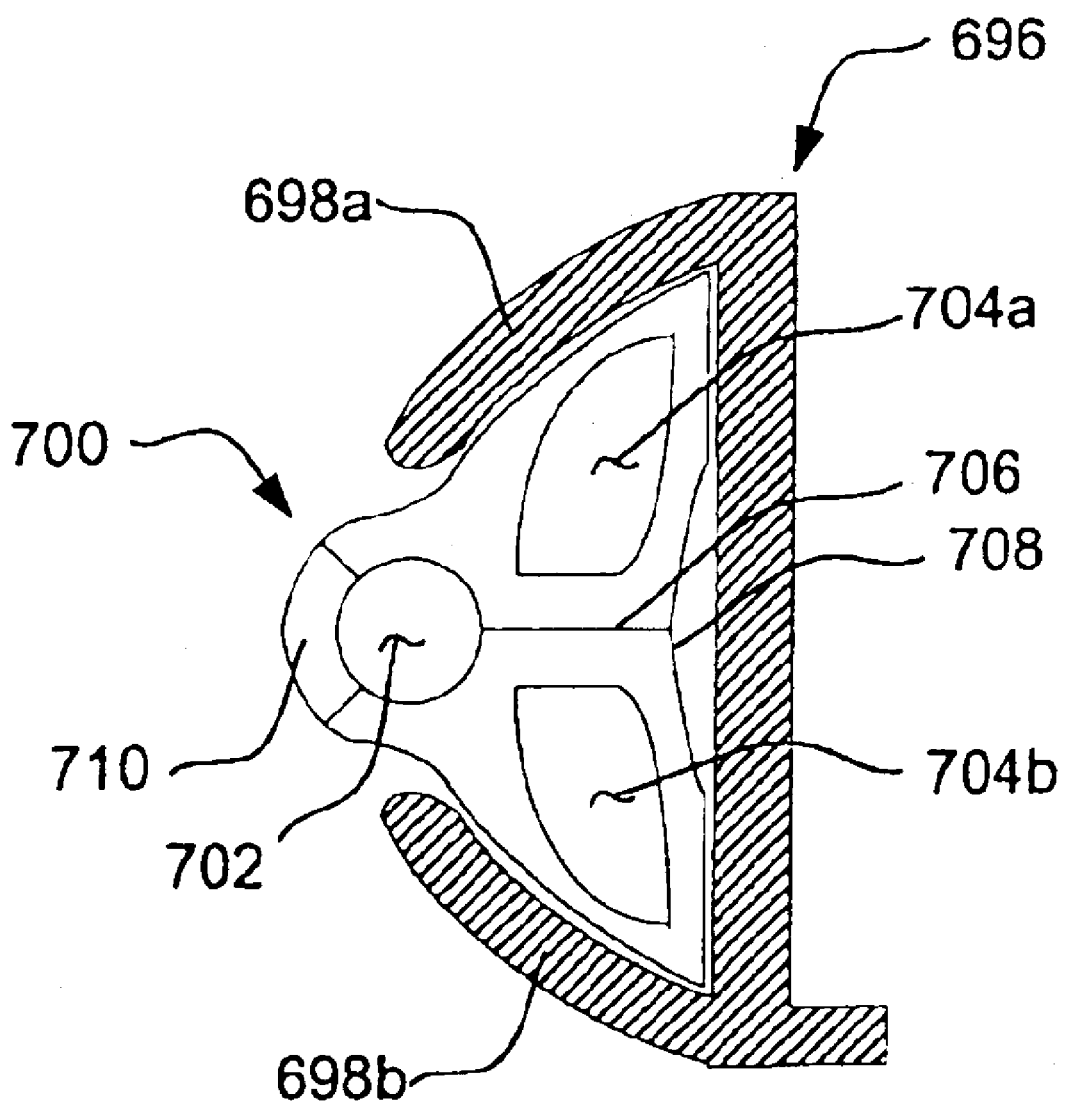
FIG. 35 is a cross-sectional side view of another illustrative lighting apparatus in accordance with the present invention.

FIG. 35 is a cross-sectional side view of another illustrative lighting apparatus in accordance with the present invention. In this illustrative embodiment, an elongated carrier 696 is provided. Like some of the embodiments above, the elongated carrier 696 includes two legs 698a and 698b that form a slot or opening for receiving an elongated bumper member or insert 700. In some embodiments, the elongated carrier 696 and/or the elongated bumper member 700 must be elastically deformed (e.g bent or otherwise deformed) for the elongated bumper member 700 to slip into the slot. To help aid the insertion of the elongated bumper member 700 into the slot of the elongated carrier 696, the elongated bumper member 700 may include one or more relief lumens 704a and 704b, if desired.

The elongated bumper member 700 may include a cavity 702. The illustrative cavity 702 is adapted to receive an elongated light source (not shown), such as an electro-luminescent wire, a linear emitting fiber, or any other suitable elongated light source. The elongated bumper member 700, or a portion thereof, may be formed from a transparent or semi-transparent material. The transparent or semi-transparent material preferably defines at least part of the cavity 702, and extends to an outer surface of the elongated bumper member 700. In the embodiment shown, portion 710 may be formed from a transparent or semi-transparent material. When so provided, the light from the elongated light source may pass through the transparent or semi-transparent portion of the elongated bumper member 700 and away from the lighting apparatus.

To help aid with the insertion of the elongated light source into the cavity 702, a slit 706 may be provided. The slit may extend from the cavity 702 to an outer surface 708 of the elongated bumper member 700. In the embodiment shown, the slit extends from the cavity 702 to the outer surface 708 adjacent the back of the carrier 698, but this is not required.

Figure 36A:
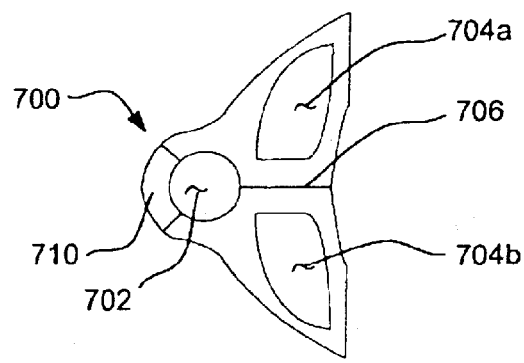
FIG. 36A is a cross-sectional side view of the elongated bumper member (or insert) 700 of FIG. 35, with the slit 706 in the closed position.

FIG. 36A is a cross-sectional side view of the elongated bumper member (or insert) 700 of FIG. 35, with the slit 706 in the closed position. In one embodiment, the slot of the elongated carrier 698 as well as the shape and size of the elongated bumper member 700 are adapted so that when the elongated bumper member 700 is inserted into the slot of the elongated carrier 698, the elongated carrier 698 provides a closing force to keep the slit 706 in, or nearly in, the closed position.

Figure 36B:
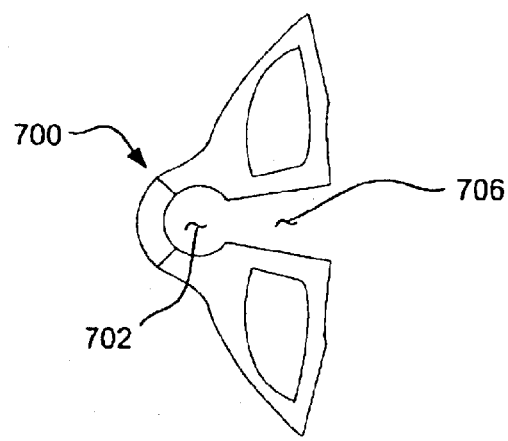
FIG. 36B is a cross-sectional side view of the elongated bumper member (or insert) of FIG. 35, with the slit in an open position.

FIG. 36B is a cross-sectional side view of the elongated bumper member (or insert) of FIG. 35, with the slit in an open position. In the illustrative embodiment, the elongated bumper member 700 is normally in the closed position, as shown in FIG. 36A. To place the elongated bumper member 700 in the open position, the elongated bumper member 700 is at least partially elastically deformed (e.g bent or otherwise deformed) by applying an outward force. Alternatively, the elongated bumper member 700 may normally be in the open position, as shown in FIG. 36B. To place the elongated bumper member 700 in the closed position, the elongated bumper member 700 is at least partially elastically deformed (e.g bent or otherwise deformed) by applying an inward force. In either case, the elongated bumper member 700 may more easily receive an elongated light source (not shown) through the slit 706 when in the open position.

Figure 36C:
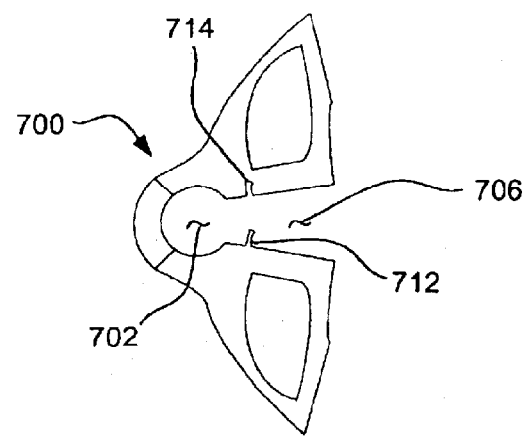
FIG. 36C is a cross-sectional side view of the insert of FIG. 35, with the slit in an open position and with a slit latching mechanism.

FIG. 36C is a cross-sectional side view of the insert of FIG. 35, with the slit in an open position and with a slit latching mechanism. In the illustrative embodiment, the slit latching mechanism includes a leg with a tooth 712, along with a matching receiving opening 714. As the elongated bumper member 700 is moved into the closed position, the leg 712 slides into the matching receiving opening 714, and the tooth 712 snaps into a corresponding opening in the receiving opening. The latching mechanism may help the elongated bumper member 700 remain in the closed position.

Figure 37:
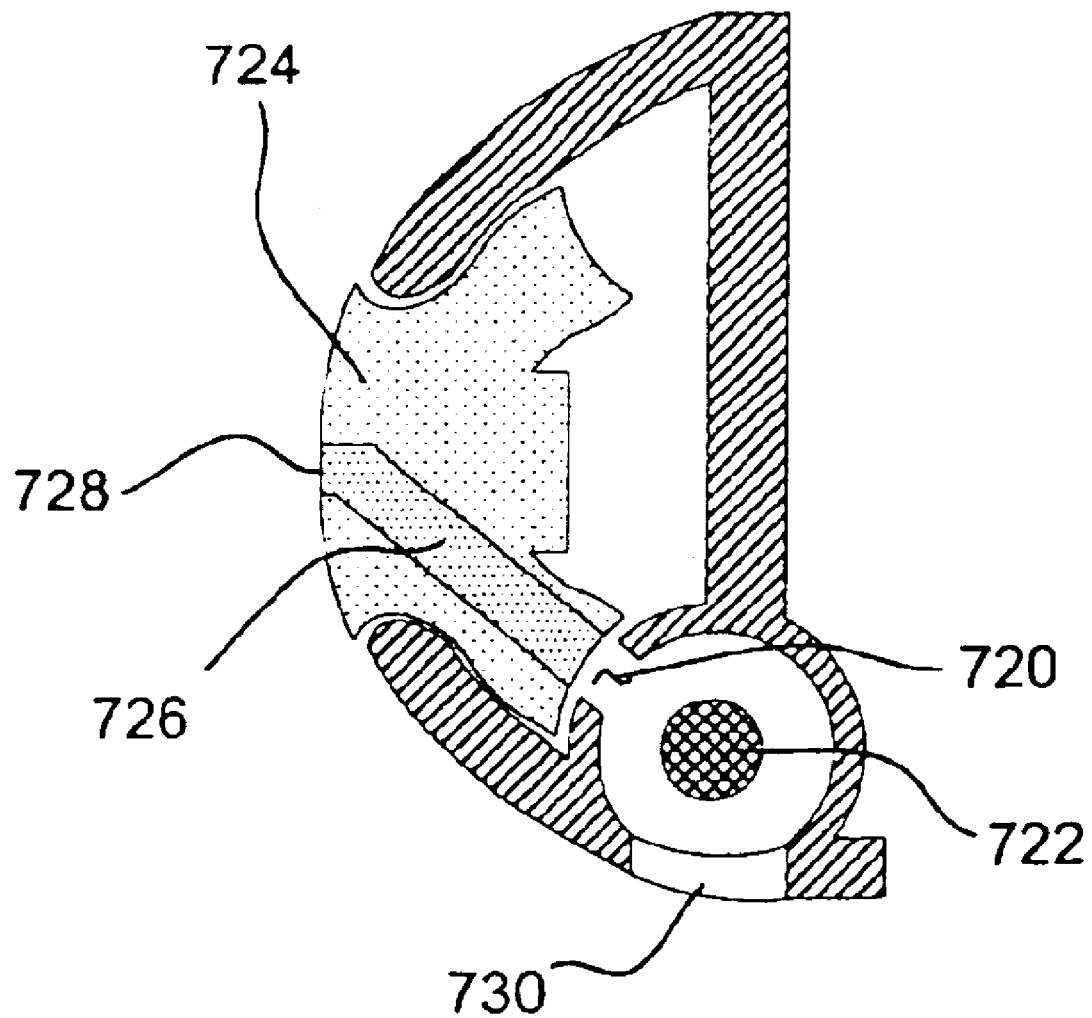
FIG. 37 is a cross-sectional side view of another illustrative lighting apparatus in accordance with the present invention.

FIG. 37 is a cross-sectional side view of another illustrative lighting apparatus in accordance with the present invention. This illustrative embodiment is similar to that shown in FIG. 26. However, the receiving slot 720 for receiving the light source 722 may be wider, and may be used to direct light from the light source 722 to the elongated bumper member 724. The elongated bumper member 724 may then include a transparent or semi-transparent portion 726 that directs the light received through the receiving slot 720 to an outer surface 728 of the elongated bumper member 724. In some embodiments, the entire elongated bumper member 724 may be made from a transparent or semi-transparent material. In other embodiments, only a portion of the elongated bumper member 724 is transparent or semi-transparent portion, as shown. In either case, the embodiment shown in FIG. 37 may allow light from the light source 722 to be directed to multiple locations, such as down through a transparent or semi-transparent window 730 as well as to the outer surface 728 of the elongated bumper member 724.

Figure 38:
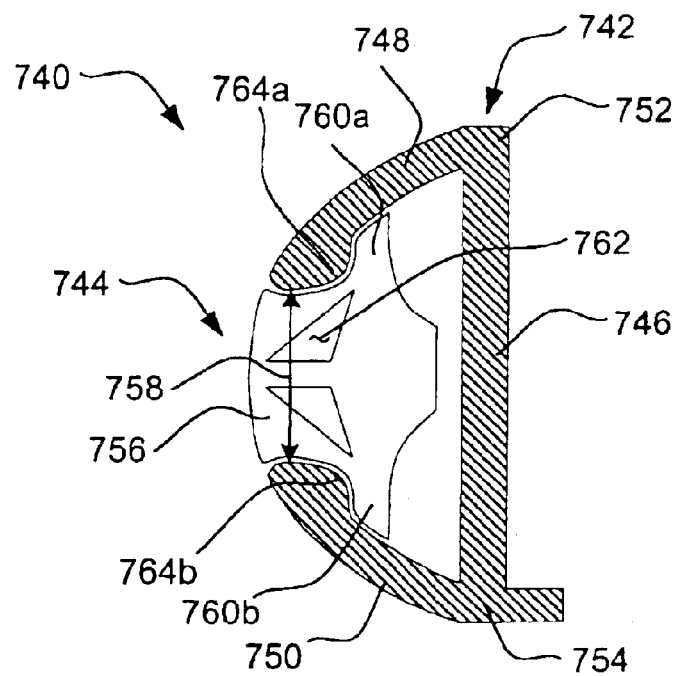
FIG. 38 is a cross-sectional side view of an illustrative rub-rail with nubs in accordance with the present invention.

FIG. 38 is a cross-sectional side view of an illustrative rub-rail with nubs in accordance with the present invention. The illustrative rub-rail is generally shown at 740, and includes a carrier 742 and an elongated bumper member 744. The carrier 740 includes a back support 746, a top support leg 748 and a bottom support leg 750. The top support leg 748 and bottom support leg 750 are shown extending from the top 752 and bottom 754 ends, respectively, of the back support 746 in a leftward direction. The top support leg 748 and bottom support leg 750 terminate to define a gap or slot 758 therebetween.

The bumper member 744 is shown positioned in the gap or slot 758. The bumper member 744 preferably has an outer portion 756 that is sized to fit into the slot 758, and one or more inner facing legs 760a and 760b that extend into the cavity formed by the top support leg 748 and bottom support leg 750 of the carrier 742. The one or more legs 760a and 760b preferably have a dimension that exceeds the lateral dimension of the slot 758, which helps secure the bumper member 744 to the carrier 742. In some embodiments, the bumper member 744 and/or carrier 742 are at least somewhat elastically deformable, so that the bumper member 744 and/or the elongated carrier 742 can or must be elastically deformed (e.g bent or otherwise deformed) to allow the one or more legs 760a and 760b of the bumper member 744 to slip through the slot 758. The bumper member 744 may also have one or more relief holes or lumens, such as relieve hole or lumen 762. Such relief holes or lumens may decrease the rigidness of the bumper member 744, as desired.

One or both of the top support leg 748 and bottom support leg 750 of the carrier 742 may have a nub, such as nub 764a and/or 764b. These nubs preferably extend inward into the cavity formed by the carrier 742. For example, nub 764a of the top support leg 748 is shown extending down into the cavity of the carrier 742 toward the bottom support leg 750. Likewise, nub 764b of the bottom support leg 750 is shown extending up into the cavity of the carrier 742 toward the top support leg 748.

In the illustrative embodiment, the top support leg 748 has an increased thickness at nub 764a, and the bottom support leg 750 has an increased thickness at nub 764b. In other embodiments, however, the thickness may remain relatively constant along the length of the top and/or bottom support legs, with both the inner surface and outer surface of the support legs extending inwardly to form the corresponding nub. Although the nubs 764a and 764b are shown near the distal end of the corresponding support leg away from the back member 746, it is contemplated that the nubs may be placed anywhere along the top and/or bottom support legs 748 and 750, and/or along the back member 746 as desired. In addition, multiple nubs may be placed along one or more of the top support leg, bottom support leg and/or back support 746, as desired. The elongated bumper member 744 preferably is shaped to accept the one or more nubs provided on the top support leg, bottom support leg and/or back support, as shown.

Figure 39:
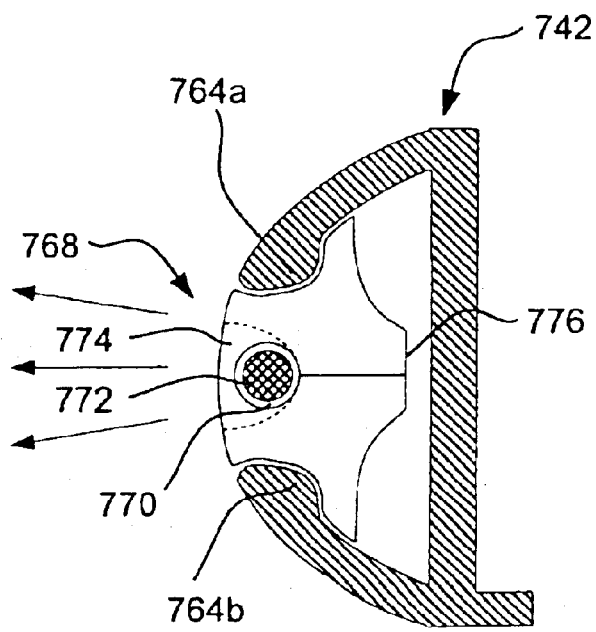
FIG. 39 is a cross-sectional side view of an illustrative lighting apparatus with nubs in accordance the present invention.

FIG. 39 is a cross-sectional side view of an illustrative lighting apparatus with nubs in accordance the present invention. This embodiment is similar to that shown in FIG. 38, but the elongated bumper member 768 includes a cavity 770 for receiving a light source 772, as shown. The elongated bumper member 768 is shaped to accept the nubs 764a and 764b provided on the top support leg 748 and bottom support leg 750, respectively. That is, the elongated support member 768 includes an outer surface that is shaped to correspond to the inner surface of the carrier 742, including nubs 764a and 764b. As indicated above, nubs 764a and 764b do not need to be positioned at or near the distal end of the top support leg 748 and/or bottom support leg 750, but rather may be positioned anywhere along the top support leg 748, bottom support leg 750 and/or back support 746, depending on the application.

In the illustrative embodiment, the elongated support member 768 may be made from a transparent or semitransparent material, or alternatively only a portion 774 (indicated by a dashed line) of the elongated support member 768 may be made from a transparent or semitransparent material, with the remainder made from a substantially non-transparent material. In addition, the illustrative elongated support member 768 includes a slit that extends from the cavity 770 to the back outer surface 776 of the elongated support member 768 to aid in the insertion of the elongated light source 772 into the cavity 770.

Figure 40:
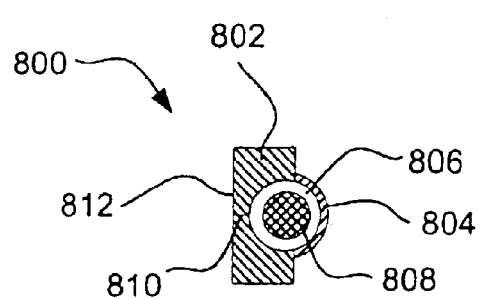
FIG. 40 is a cross-sectional side view of an illustrative lighting apparatus for receiving an elongated light source.

FIG. 40 is a cross-sectional side view of an illustrative lighting apparatus for receiving an elongated light source. The illustrative lighting apparatus is shown generally at 800, and includes a body 802. The body 802 includes a cover portion 804, which together form a cavity 806 for receiving an elongated light source 808. The body 802 may be transparent or semi-transparent, or substantially non-transparent, depending on the application. In one illustrative embodiment, the cover 804 is transparent or semi-transparent, and the remainder of the body 802 is substantially non-transparent. The cover 804 may be shaped to form a lens, but this is not required. In another illustrative embodiment, the cover 804 is substantially non-transparent and the remainder of the body 802 is transparent or semi-transparent.

It is contemplated that the cover 804 may be formed integrally with the remainder of the body 802 (such as by, for example, extrusion, co-extrusion, molding, or any other suitable method). Alternatively, the cover 804 may be formed separately from the remainder of the body 802. When formed separately from the remainder of the body 802, the cover 804 may be later secured to the remainder of the body 802 by, for example, a snapping mechanism, an adhesive, screws, or any other suitable securing method. In some embodiments, the cover 804 is secured to the remainder of the body 802 after the elongated light source is inserted into the cavity 806.

In some embodiments, the body 802 may include a slit 810 that extends from the cavity 806 to an outer surface of the body 802, such as outer surface 812. The slit 810 may be moved to an open position, by for example applying an external outward force, which may help aid in the insertion of the elongated light source 808 into the cavity 806 through the slit 810. Like other embodiments, it is contemplated that the illustrative lighting apparatus 800 may be mounted to, for example, any object including a boat, retail and/or store shelving and/or equipment (including grocery store shelving and/or equipment such as refrigerated shelving), bars, desks, counters, walls such as in hallways or rooms, ceilings, railings, steps, and/or any other object or surface, as desired. The body 802 may help provide a level of protection to the object and/or a level of protection to the elongated light source.

Figure 41:
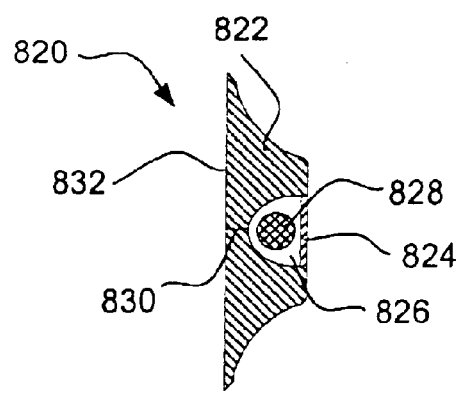
FIG. 41 is a cross-sectional side view of another illustrative lighting apparatus for receiving an elongated light source.

FIG. 41 is a cross-sectional side view of another illustrative lighting apparatus for receiving an elongated light source. The illustrative lighting apparatus is shown generally at 820, and includes a body 822. The body 820 includes a cover portion 824, which together form a cavity 826 for receiving an elongated light source 828. In the illustrative embodiment, the cavity 826 is parabolic in shape, which in some embodiments, may help focus (by reflection) the light provided by the elongated light source 828 toward the cover portion 824. The body 822 may be transparent or semi-transparent, or substantially non-transparent, depending on the application. In one illustrative embodiment, the cover 824 is transparent or semi-transparent, and the remainder of the body 822 is substantially non-transparent. The cover 824 may be flat or shaped to form a lens, as desired. In another illustrative embodiment, the cover 824 is substantially non-transparent and the remainder of the body 822 is transparent or semi-transparent.

It is contemplated that the cover 824 may be formed integrally with the remainder of the body 822 (such as by, for example, extrusion, co-extrusion, molding, or any other suitable method). Alternatively, the cover 824 may be formed separately from the remainder of the body 822. When formed separately from the remainder of the body 822, the cover 824 may be later secured to the remainder of the body 822 by, for example, a snapping mechanism, an adhesive, screws, or any other suitable securing method. In some embodiments, the cover 824 is secured to the remainder of the body 822 after the elongated light source is inserted into the cavity 826.

In some embodiments, the body 822 may include a slit 830 that extends from the cavity 826 to an outer surface of the body 822, such as outer surface 832. The slit 830 may be moved to an open position, by for example applying an external outward force, which may help aid in the insertion of the elongated light source 828 into the cavity 826 through the slit 830. It is contemplated that the illustrative lighting apparatus 820 may be mounted to, for example, any object including boats, retail and/or store shelving and/or equipment (including grocery store shelving and/or equipment such as refrigerated shelving), bars, desks, counters, walls such as in hallways or rooms, ceilings, railings, steps, and/or any other object or surface, as desired. The body 822 may help provide a level of protection to the object and/or a level of protection to the elongated light source.

Figure 42:
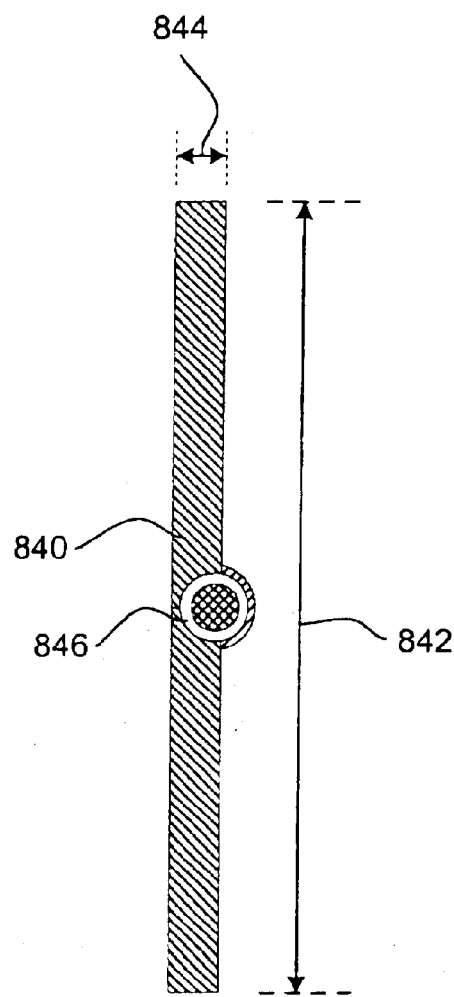
FIG. 42 is a cross-sectional side view of yet another illustrative lighting apparatus for receiving an elongated light source.

FIG. 42 is a cross-sectional side view of yet another illustrative lighting apparatus for receiving an elongated light source. This illustrative embodiment is similar to the embodiment shown in FIG. 41, but the body 840 has a height 842 that is substantially greater than the thickness 844. In addition, the body 840 extends a substantial distance beyond the cavity 846. In one example, the cavity may have a diameter on the order of 0.050 inches, and the height 842 of the body 840 may be on the order of 0.25 to 24 inches or more. In some embodiments, this may provide a relatively large protection area (represented by the height 842 of the body 840) to an object.

Figure 43:
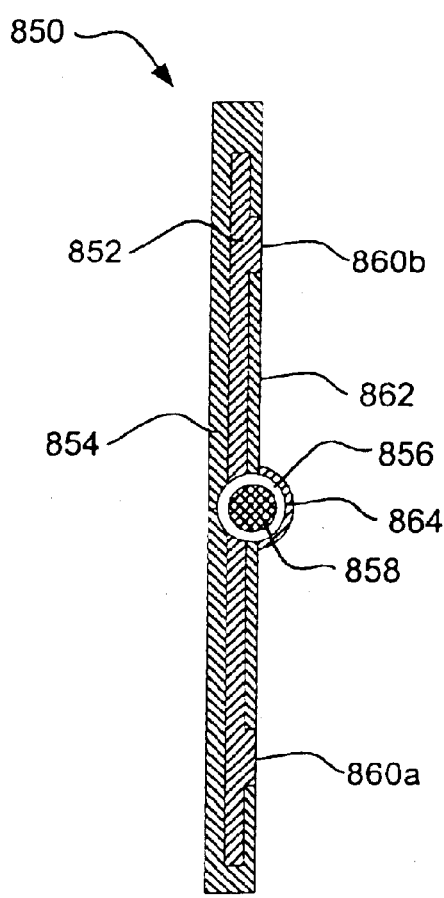
FIG. 43 is a cross-sectional side view of another illustrative lighting apparatus for receiving an elongated light source.

FIG. 43 is a cross-sectional side view of another illustrative lighting apparatus for receiving an elongated light source. This illustrative embodiment is similar to the embodiment of FIG. 42. However, the body 850 includes both a first material 852 that is at least semi-transparent and a second material 854 that is substantially non-transparent. The at least semi-transparent material 852 is shown extending from the cavity 856 that houses the elongated light source 858 to one or more outer surfaces 860*a* and 860*b* of the body 850. The at least semi-transparent material 852 thus at least partially defines the cavity 856 and accepts light therefrom. The light is then delivered down the at least semi-transparent material 852 to the illuminate the one or more outer surfaces 860*a* and 860*b*. In the illustrative embodiment, the outer surface 862 between the one or more outer surfaces 860*a* and 860*b* is substantially non-transparent, with the possible exception of cover portion 864, but this is not required.

It is contemplated that the one or more outer surfaces 860*a* and 860*b* may be flat or may be shaped to form a lens, depending on the application. In addition, it is contemplated that the at least semi-transparent material 852 may have a higher index of refraction than the substantially non-transparent material 854, but this is not required. This may promote greater total internal reflection of the light as it travels down the at least semi-transparent material 852, much like an optical fiber.

In one illustrative embodiment, the at least semi-transparent material 852 may be integrally formed with the substantially non-transparent material 854. For example, the at least semi-transparent material 852 may be co-extruded with the substantially non-transparent material 854. Alternatively, the at least semi-transparent material 852 may be separately formed from the substantially non-transparent material 854, and subsequently mechanically secured together, as desired.

Figure 44:
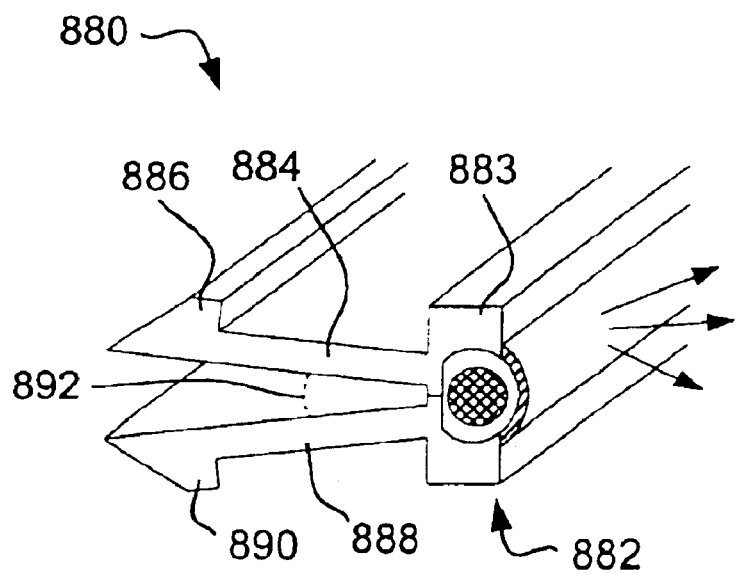
FIG. 44 is a cross-sectional side view of an illustrative lighting apparatus with one or more legs for securing the lighting apparatus to a substrate.

FIG. 44 is a cross-sectional side view of an illustrative lighting apparatus with one or more legs for securing the lighting apparatus to a substrate. The illustrative lighting apparatus is generally shown at 880 and includes a body 882. The body 882 includes a main body portion 883, a first leg 884 with a first tooth 886, and a second leg 888 with a second tooth 890. In this illustrative embodiment, the first leg 884 and second leg 888 extend continuously along the length of the main body portion 883. The first leg 884 and the second leg 888 are shown extending away from the main body portion 883 at an angle 892 that is greater than zero. However, in some embodiments, the angle 892 may be zero or even negative, depending on the application. The main body portion 883 is similar that shown in FIG. 40.

Figure 45:
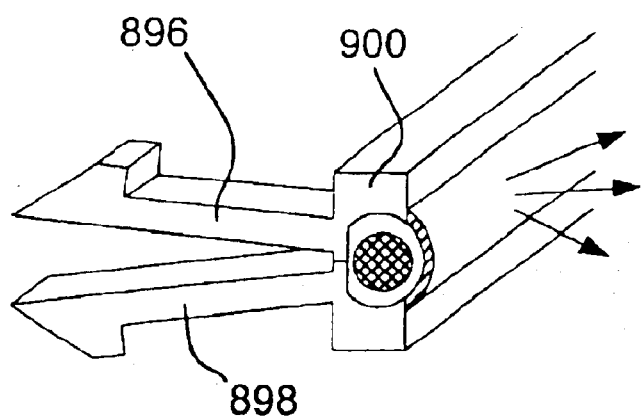
FIG. 45 is a cross-sectional side view of another illustrative lighting apparatus with one or more legs for securing the lighting apparatus to a substrate.

FIG. 45 is a cross-sectional side view of another illustrative lighting apparatus with one or more legs for securing the lighting apparatus to a substrate. This illustrative embodiment is similar to the embodiment shown in FIG. 44, except the first leg 896 and the second leg 898 do not extend continuously along the length of the main body portion 900. Rather, and in one embodiment, one or more first and second leg pairs 896, 898 are provided periodically along the length of the main body portion. Only one first and second leg pair is shown.

Figure 46:
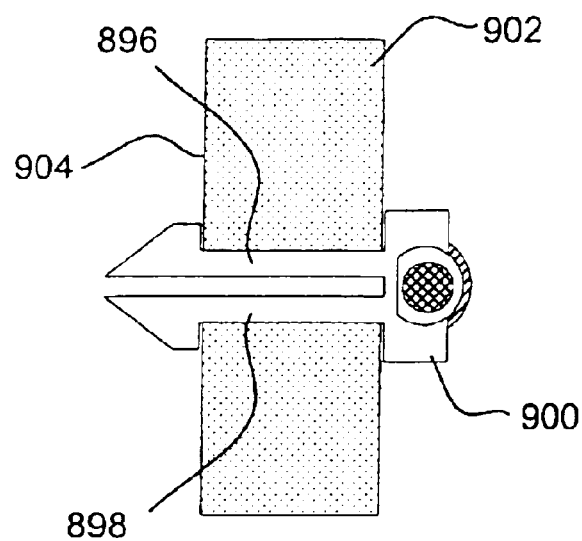
FIG. 46 is a cross-sectional side view of the illustrative lighting apparatus of FIG. 45 with the one or more legs inserted through a substrate.

FIG. 46 is a cross-sectional side view of the illustrative lighting apparatus of FIG. 45 with the first leg 896 and the second leg 898 inserted through a substrate 902. As the first leg 896 and the second leg 898 are pushed through a hole in the substrate 902, the first leg 896 and the second leg 898 are forced closer together, which may temporarily elastically deforming the first leg 896 and the second leg 898. Once the teeth reach the backside 904 of the substrate 902, the first leg 896 and the second leg 898 separate and the teeth engage the backside 904 of the substrate 902 as shown. This may help secure the illustrative lighting apparatus to the substrate 902. The substrate may be any type of substrate including, for example, wall board, plywood, cement, fiberglass, metal, or any other type of substrate, as desired.

Figure 47:
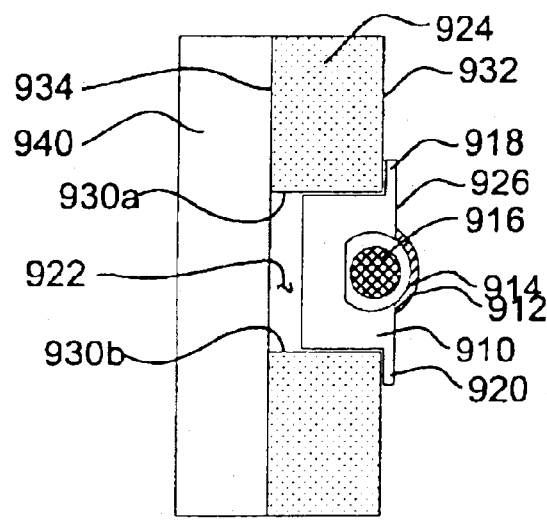
FIG. 47 is a cross-sectional side view of yet another illustrative lighting apparatus attached to a substrate.

FIG. 47 is a cross-sectional side view of yet another illustrative lighting apparatus attached to a substrate. The illustrative lighting apparatus is shown generally at 908, and includes an elongated body 910. The elongated body 910 includes a cover portion 912, which together form an elongated cavity 914 for receiving an elongated light source 916. The elongated body 910 may be transparent or semi-transparent, or substantially non-transparent, depending on the application. In one illustrative embodiment, the cover 912 is transparent or semi-transparent, and the remainder of the body 910 is substantially non-transparent. The cover 912 may be shaped to form a lens, but this is not required. In another illustrative embodiment, the cover 912 is substantially non-transparent and the remainder of the body 910 is transparent or semi-transparent.

The elongated body 910 shown in FIG. 47 includes an upper extending leg 918 that extends upward from the remainder of the body 910, and a lower extending leg 920 that extends downward from the remainder of the body 910. The upper extending leg 918 and lower extending leg 920 may be relatively thin, and may extend outward from the remainder of the body 910 along a plane formed by the front face 926 of the remainder of the body 910, but this is not required.

In one embodiment, the main body 910 is inserted into an appropriately sized recess or hole 922 in a substrate 924. The upper extending leg 918 and lower extending leg 920 preferably extend out past the upper and lower edges 930*a* and 930*b* of the elongated recess or hole 922, and engage the front face 932 of the substrate 924 as shown. In some embodiments, the upper extending leg 918 and lower extending leg 920 are secured to the substrate by, for example, an adhesive, screws, or any other suitable securing method, as desired.

In some embodiments, the body does not extend to the backside 934 of the substrate 924. When so provided, the illustrative lighting apparatus may not disturb objects behind the substrate, such as studs 940 or any other members or objects behind the substrate 924. In other embodiments, the body 910 may extend to or beyond the backside 934 of the substrate 924, as desired.

Figure 48:
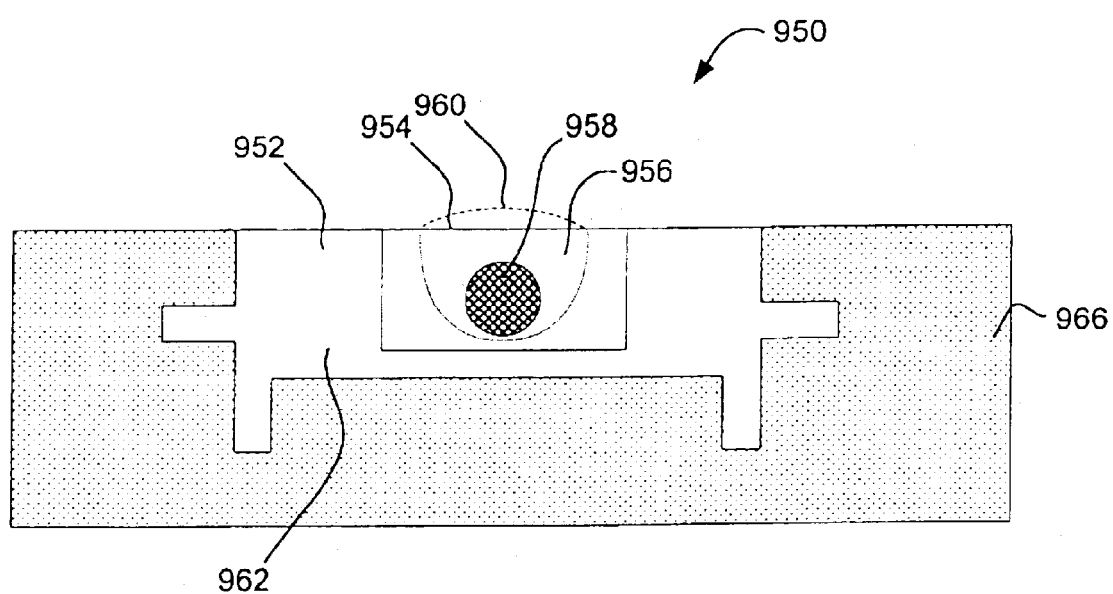
FIG. 48 is a cross-sectional side view of an illustrative lighting apparatus for securing an elongated light source to a substrate.

FIG. 48 is a cross-sectional side view of an illustrative lighting apparatus for securing an elongated light source to a substrate. This embodiment may be particularly suitable for securing an elongated light source to a substrate that can be initially provided in a liquid or semi-liquid state, and then cured or hardened to a more solid state. The illustrative lighting apparatus is shown generally at 950, and includes an elongated member or body 952. The elongated member 952 includes a cover 954, which together form a cavity 956 for receiving an elongated light source 958.

The elongated member or body 952 may be transparent or semi-transparent, or substantially non-transparent, depending on the application. In one illustrative embodiment, the cover 954 is transparent or semi-transparent, and the remainder of the elongated member or body 952 is substantially non-transparent. The cover 954 may be flat, or shaped to form a lens such as a convex lens shown by dotted line 960. In another illustrative embodiment, the cover 954 is substantially non-transparent and the remainder of the elongated member or body 952 is transparent or semi-transparent.

It is contemplated that the cover 954 may be formed integrally with the remainder of the elongated member or body 952 (such as by, for example, extrusion, co-extrusion, molding, or any other suitable method). Alternatively, the cover 954 may be formed separately from the remainder of the elongated member or body 952. When formed separately from the remainder of the elongated member or body 952, the cover 954 may be later secured to the remainder of the elongated member or body 952 by, for example, a snapping mechanism, an adhesive, screws, or any other suitable securing method. In some embodiments, the cover 954 is secured to the remainder of the elongated member or body 952 after the elongated light source 958 is inserted into the cavity 956. In the illustrative embodiment, the cavity 956 is parabolic in shape to help direct (by reflection) the light produced by the elongated light source 958 toward the cover 954, but this is not required.

In some embodiments, the elongated member or body 952 may include a removable portion 962, which may include the cavity 956, the elongated light source 958 and the cover 954. The removable portion 962 may then be selectively removed from the remainder of the elongated member or body 952, as desired. This may be particularly useful when the remainder of the elongated member or body 952 is permanently secured to a substrate, as further described below.

The elongated member or body 952 may have one or more legs, such as legs 964a, 964b, 964c and 964d, which extend away from the remainder of the elongated member or body 952. In the embodiment shown, legs 964a, 964b, 964c and 964d may help secure the elongated member or body 952 to the substrate 966.

As noted above, this illustrative embodiment may be particularly suitable for securing an elongated light source to a substrate 966, and in particular, a substrate 966 that can initially be provided in a liquid or semi-liquid state, and then cured or hardened to a more solid state. For example, the substrate 966 may be poured in a liquid or semi-liquid state, and then the elongated member or body 952 may be inserted into the substrate 966 as shown. The liquid or semi-liquid substrate may flow around the legs 964a, 964b, 964c and 964d of the elongated member or body 952. When the substrate is cured or hardened to a more solid state, the elongated member or body 952 becomes secured to the substrate 966, and in some cases, permanently secured to the substrate 966.

In some embodiments, the substrate 966 may be, for example, concrete, asphalt, plastic, fiberglass, foam, or any other material that can be initially provided in a liquid or semi-liquid state, and then cured or hardened to a more solid state. The substrate may be part of, for example, a roadway, an airport runway, a wall, a floor, a stair, a ceiling, a running track, a boat, a car, a truck, a retaining wall, a swimming pool, a guard rail, or any other suitable surface or object, as desired.

In some embodiments, the elongated member or body 952 may be formed from a relatively rigid material, such as Vinyl, PVC, rubber, plastic, aluminum, or any other suitable material. When so provided, the removable portion 962 may be formed from the same or a different material than the elongated member or body 952.

For some applications, the elongated member or body 952 may be formed from a relatively flexible or elastic material. This may be useful when, for example, there is a difference in the coefficient of thermal expansion between the substrate 966 and the elongated member or body 952. Again, the removable portion 962 may be formed from the same or a different material such as a more rigid material, depending on the application.

Figure 49:
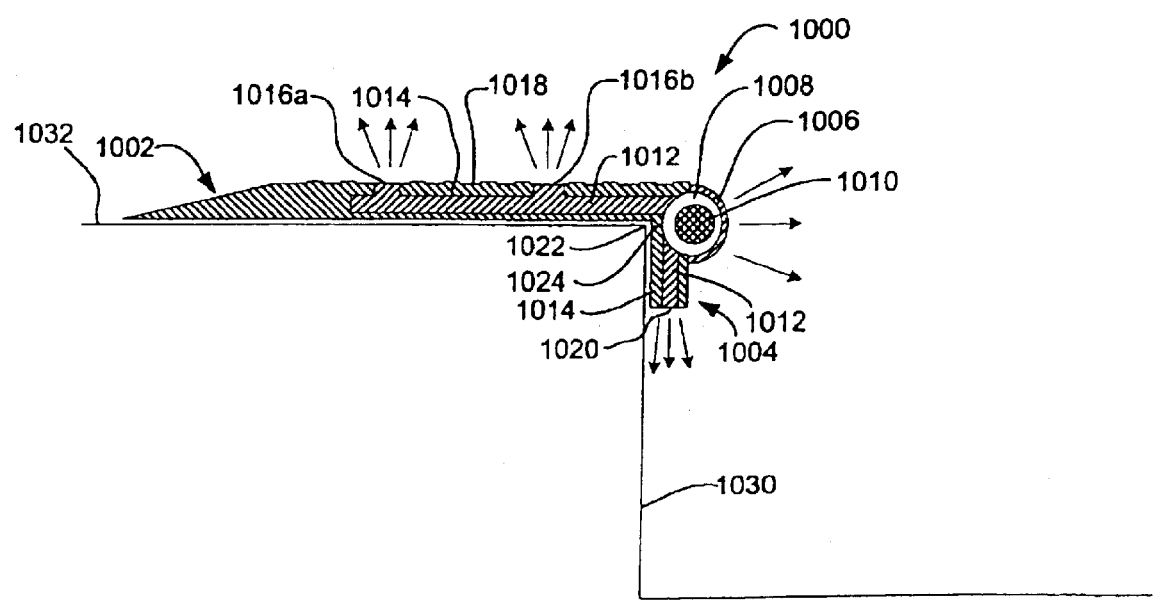
FIG. 49 is a cross-sectional side view of an illustrative lighting apparatus for use with a stair or other ledge.

FIG. 49 is a cross-sectional side view of an illustrative lighting apparatus for use with a stair or other ledge. The illustrative lighting apparatus is generally shown at 1000, and includes an elongated member or body that has a horizontally extending portion 1002 and a vertically extending portion 1004. In some embodiments, either the horizontally extending portion 1002 or the vertically extending portion 1004 may be omitted. The illustrative elongated member includes a cover portion 1006, which together form a cavity 1008 for receiving an elongated light source 1010.

In the illustrative embodiment, the horizontally extending portion 1002 of the elongated member includes both a first material 1012 that is at least semi-transparent and a second material 1014 that is substantially non-transparent. The at least semi-transparent material 1012 is shown extending from the cavity 1008 that houses the elongated light source 1010 horizontally to one or more outer surfaces 1016a and 1016b of the body. The at least semi-transparent material 1012 thus at least partially defines the cavity 1008 and accepts light therefrom. The light is delivered down the at least semi-transparent material 1012 to the illuminate the one or more outer surfaces 1016a and 1016b. In the illustrative embodiment, the outer surface 1018 between the one or more outer surfaces 1016a and 1016b is substantially non-transparent, but this is not required. It is contemplated that the one or more outer surfaces 1016a and 1016b may be flat or shaped to form a lens, depending on the application. In addition, it is contemplated that the at least semi-transparent material 1012 may have a higher index of refraction than the substantially non-transparent material 1014 to promote greater total internal reflection of the light as it travels down the at least semi-transparent material 1012, much like an optical fiber.

The vertically extending portion 1004 of the elongated member may also include both a first material 1012 that is at least semi-transparent and a second material 1014 that is substantially non-transparent. The at least semi-transparent material 1012 is shown extending from the cavity 1008 that houses the elongated light source 1010 vertically down to an outer surface 1020 of the body. The at least semi-transparent material 1012 thus receives light from the cavity 1008, and delivers at least some of the light down to the outer surface 1020.

In some embodiments, the elongated member may include a slit 1024 that extends from the cavity 1008 to an outer surface of the body. The slit 1024 may be moved to an open position, by for example applying an external outward force, which may help aid in the insertion of the elongated light source 1010 into the cavity 1008 through the slit 1024.

In one illustrative embodiment, the at least semi-transparent material 1012 may be integrally formed with the substantially non-transparent material 1014. For example, the at least semi-transparent material 1012 may be co-extruded with the substantially non-transparent material 1014. Alternatively, the at least semi-transparent material 1012 may be separately formed from the substantially non-transparent material 1014, and subsequently mechanically secured together, as desired.

The illustrative lighting apparatus 1000 may be mounted to a stair or other ledge as shown. The cavity 1008 is shown positioned adjacent the ledge 1022 of the stair or ledge. However, it is contemplated that the cavity 1008 may be positioned anywhere along the elongated member, as desired, including adjacent the downward extending surface 1030 of the stair and/or adjacent the substantially horizontally extending surface 1032 of the stair.

Figure 50:
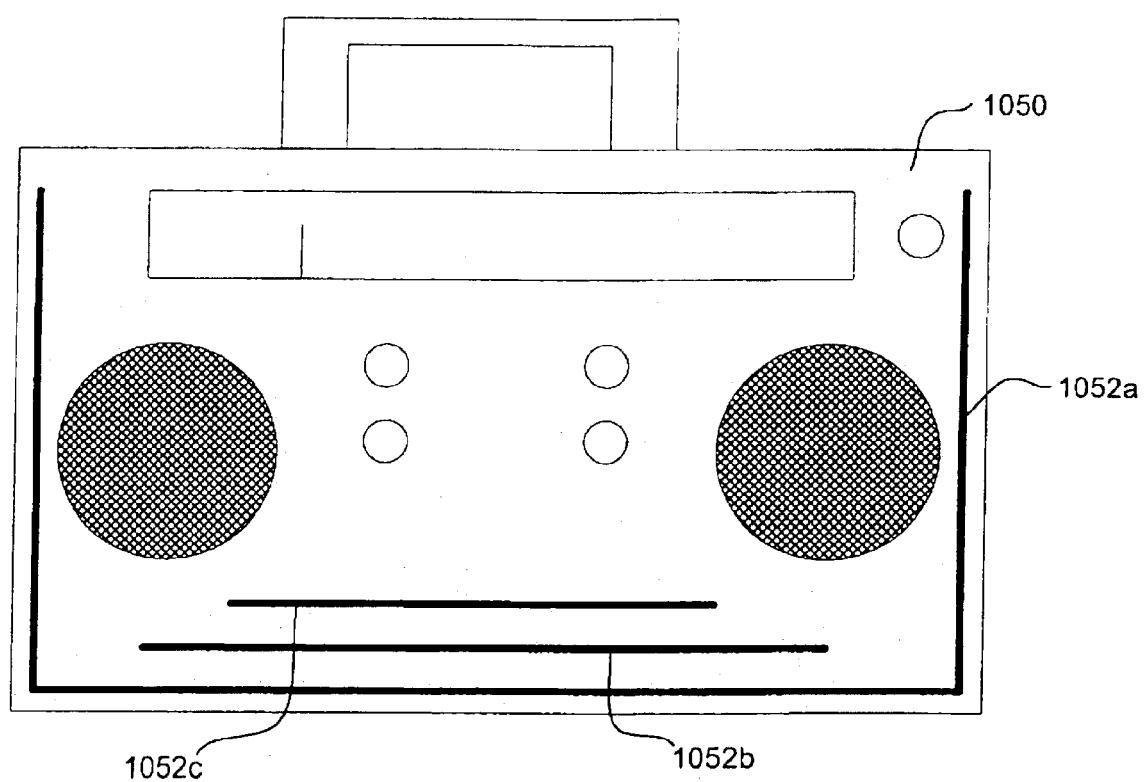
FIG. 50 is a schematic diagram of an illustrative appliance having an elongated light source positioned along the body of the appliance.

FIG. 50 is a schematic diagram of an illustrative appliance having an elongated light source positioned along the body of the appliance. In some applications, it may be desirable to include an elongated light source along the body of an appliance to increase the visual appeal of the appliance, and in some cases, provide low level lighting. Almost any appliance may benefit, including household or office devices operated by gas or electric current. Some illustrative appliances include radios, CD players, DVD players, televisions, refrigerators, stoves, toasters, phones, etc.

In one illustrative embodiment of the present invention, the outer housing of an appliance is provided with an elongated cavity. The term cavity, as used throughout, may include an open cavity or a closed cavity. An open cavity is one that is open on one or more sides, and a closed cavity is one that is closed on all sides. The elongated cavity extends along at least a portion of the outer housing, and is adapted to receive an elongated light source, such as an electro-luminescent wire. The cavity is preferably at least partially defined by a material that is at least partially transparent, and which extends to an outer surface of the housing. In some embodiments, the housing may also include a substantially non-transparent material, which in some cases, may be at least partially reflective. The substantially non-transparent material may include a surface that is shaped to reflect light toward the outer surface of the housing.

FIG. 50 shows one such appliance fitted with an elongated light source. The appliance shown in FIG. 50 is a portable music producing device. The portable music producing device includes an outer housing 1050 that has an elongated cavity formed therein. An elongated light source, such as an electro-luminescent wire, is provided in the elongated cavity as shown at 1052a, 1052b and 1052c. Each elongated cavity is preferably at least partially defined by a material that is at least partially transparent, and which extends to an outer surface of the housing 1050 so that the light produced by the elongated light source is visible to the user of the appliance. The elongated light source may receive power from the power source of the appliance. An inverter may be required in some applications to produce the desired power signal to drive the elongated light source.

It is contemplated that the elongated light source may be switched on or off by one or more signals of the appliance. For example, a switch may be provided on the appliance for turning the elongated light source on and off. In another example, the elongated light source may be pulsed on and off by the changes in sound intensity produced by the radio, or may just blink at a predetermined rate. In yet another example, the elongated light source may be turned on when, for example, a toaster is toasting, and turned off when toasting is complete. These are just a few examples of controlling the elongated light source with one or more signals of an appliance.

Figure 51:
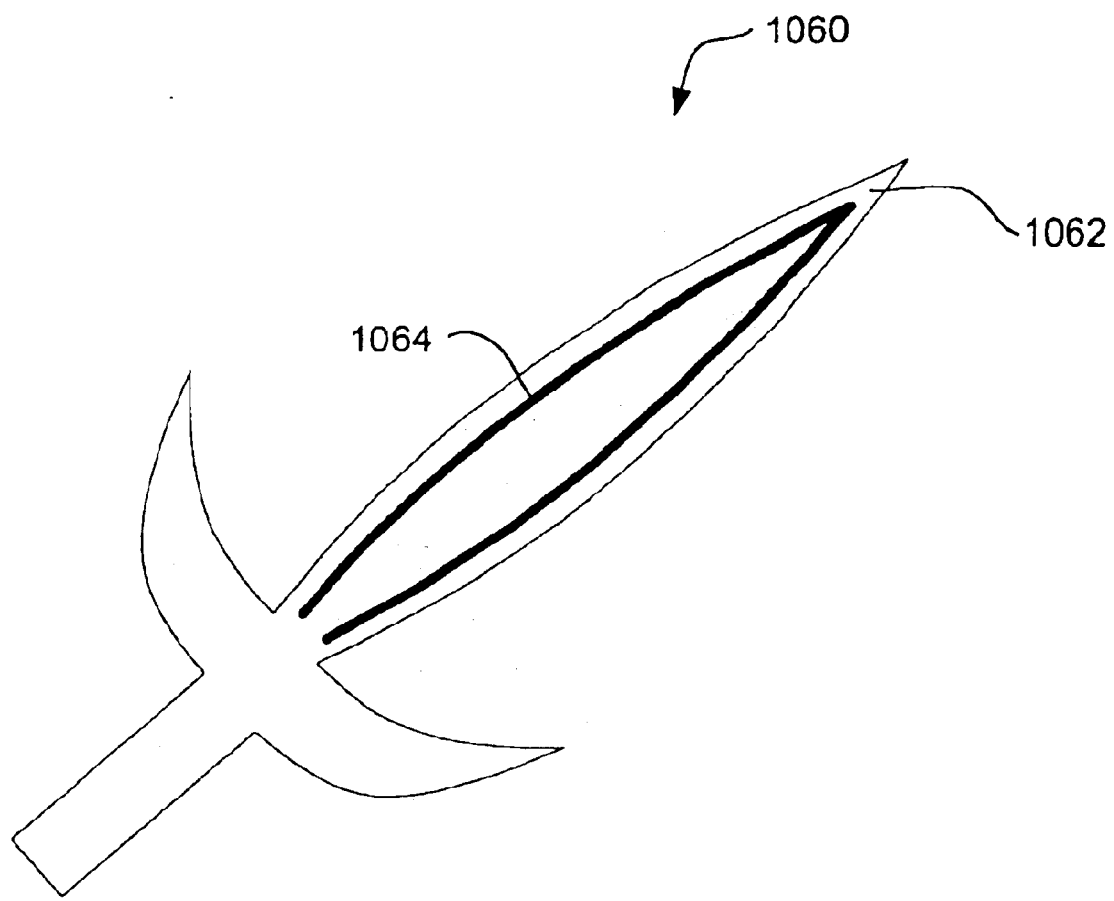
FIG. 51 is a schematic diagram of an illustrative toy having an elongated light source positioned along the body of the toy.

FIG. 51 is a schematic diagram of an illustrative toy having an elongated light source positioned along the body of the toy. In some embodiments, it may be desirable to include an elongated light source along the body of a toy to increase the visual appeal of the toy, and in some cases, provide low level lighting. Almost any toy may benefit, including toy swords, toy vehicle, board games, stuffed animals, etc.

In one illustrative embodiment, the outer shell or housing of a toy is provided with an elongated cavity. The elongated cavity extends along at least a portion of the outer shell or housing, and is adapted to receive an elongated light source, such as an electro-luminescent wire. The cavity is preferably at least partially defined by a material that is at least partially transparent, and which extends to an outer surface of the outer shell or housing. In some embodiments, the shell or housing may also include a substantially non-transparent material, which in some cases, may be at least partially reflective. The substantially non-transparent material may include a surface that is shaped to reflect light toward the outer surface of the housing.

FIG. 51 is a schematic diagram of an illustrative toy sword having an elongated light source positioned along the body of the toy. The toy sword is generally shown at 1060 and includes an outer shell or housing 1062 that has an elongated cavity formed therein. An elongated light source, such as an electro-luminescent wire, is provided in the elongated cavity as shown at 1064. The elongated cavity is preferably at least partially defined by a material that is at least partially transparent, and which extends to an outer surface of the housing 1062 so that the light produced by the elongated light source is visible to the user of the toy. The elongated light source may receive power from the toy. An inverter may be required in some applications to produce the desired power signal to drive the elongated light source.

It is contemplated that the elongated light source may be switched on or off by one or more signals of the toy. For example, a switch may be provided on the toy for turning the elongated light source on and off. In another example, the elongated light source may be pulsed on and off by movement of the toy, or may just blink at a predetermined rate. In yet another example, the elongated light source may be turned on when, for example, the toy is brought close to another similarly equipped toy. These are just a few examples of controlling the elongated light source with one or more signals of a toy.

In another illustrative embodiment, the toy may include an outer shell, and may have a power source within the outer shell. The outer shell may be a sturdy outer shell, or a more flexible outer shell such as is common for stuff animals. In some embodiments, an inverter may be provided within the outer shell and connected to an elongated light source, such as an electro-luminescent wire. At least part of the elongated light source preferably extends outside of the outer shell. For example, and in the case of a stuffed toy dog, the elongated light source may extend out of the outer shell and around the neck of the dog to produce an illuminated collar. In this embodiment, a separate cavity need not be provided in the outer shell of the toy to accommodate the elongated light source.

Figure 52:
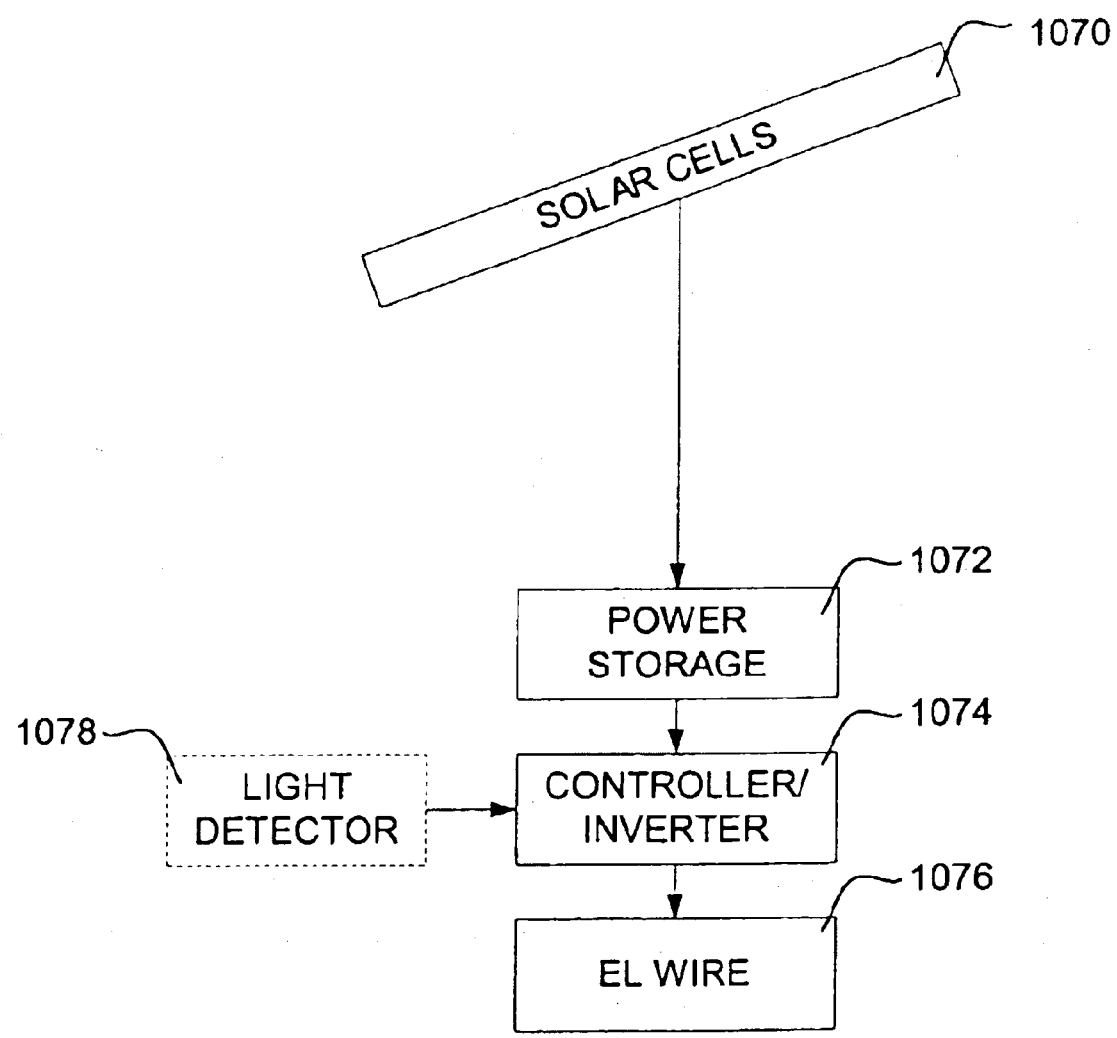
FIG. 52 is a schematic diagram of a solar powered lighting apparatus.

FIG. 52 is a schematic diagram of a solar powered lighting apparatus. In this embodiment, an elongated light source such as an electro-luminescent wire may be powered by one or more solar cells. In the illustrative embodiment shown, one or more solar cells 1070 receive light from an external source such as the sun. The electrical power generated by the one or more solar cells 1070 is provided to a power storage block 1072, which may include one or more batteries or other power storage device(s). A controller and/or inverter 1074 block may then be coupled to the power storage block 1072. The controller and/or inverter block 1074 may include an inverter to convert the power received from the power storage block 1072 to an appropriate power signal for the elongated light source 1076, such as an electro-luminescent wire.

The controller and/or inverter block 1074 may also include a controller for selectively enabling when power is delivered from the power storage block 1072 to the elongated light source 1076. For example, the controller may include a timer to prevent power from being delivered to the elongated light source during certain parts of a day, such as during day time, while allowing power to be delivered to the elongated light source at other times of the day, such as during night time. In another example, the controller may be connected to a light detector 1078. The light detector 1078 may detect the ambient lighting conditions to determine when it is day time and night time. The controller may use the output of the detector 1078 to disable power from being delivered to the elongated light source during the day time, while enabling power to be delivered to the elongated light source during the night time.

Having thus described the preferred embodiments of the present invention, those of skill in the art will readily appreciate that the teachings found herein may be applied to yet other embodiments within the scope of the claims hereto attached.

What is claimed is:

1. A lighting apparatus for receiving an elongated light source, comprising:
    an elongated member including a first material and a second material, the first material being at least semi-transparent and the second material being substantially non-transparent, the elongated member having a cavity for receiving the elongated light source, the cavity being at least partially defined by at least a portion of the first material that extends from the cavity to two or more separate outer surface regions of the elongated member, wherein at least part of the outer surface between the two or more separate regions is substantially non-transparent.

2. A lighting apparatus according to claim 1 wherein the cavity is at least partially defined by at least a portion of the second material.

3. A lighting apparatus according to claim 1 wherein the second material is at least partially reflective.

4. A lighting apparatus according to claim 3 wherein the second material includes a surface that is shaped to help reflect light toward the first material.

5. A lighting apparatus according to claim 4 wherein the shaped surface is parabolic in shape.

6. A lighting apparatus according to claim 1 wherein the first material includes a surface that is shaped as a lens.

7. A lighting apparatus according to claim 1 further comprising a slit or opening that extends between the cavity and the exterior of the elongated member to facilitate insertion and/or extraction of the elongated light source into/from the cavity along a length of the elongated member.

8. A lighting apparatus according to claim 7 wherein the elongated member has a viewing side for viewing light emitted by the elongated light source and one or more non-viewing sides, wherein the slit or opening extends along one of the non-viewing sides.

9. A lighting apparatus according to claim 1 wherein the first material and the second material are integrally formed in a single piece.

10. A lighting apparatus according to claim 1 wherein the first material and the second material are formed separately and subsequently secured together.

11. A lighting apparatus according to claim 1 wherein the elongated light source is an electro-luminescent wire.

12. A lighting apparatus according to claim 1 wherein the elongated light source is a linear emitting fiber.

13. A lighting apparatus according to claim 1 wherein the elongated light source includes a glow-in-the-dark material.

14. A lighting apparatus for receiving an elongated light source, comprising:
    a first elongated piece;
    a second elongated piece;
    at least a portion of the first elongated piece being transparent or semi-transparent;
    at least a portion of the second elongated piece being substantially non-transparent;
    the first elongated piece and the second elongated piece defining a cavity for receiving the elongated light source; and
    at least one of the first elongated piece and the second elongated piece having an elongated opening along at least put of its length that extends between the cavity and the exterior of the lighting apparatus, the opening adapted to facilitate insertion and/or extraction of the elongated light source into/from the cavity along a length of the lighting apparatus.

15. A lighting apparatus according to claim 14 wherein the first elongated piece and the second elongated piece are integrally formed.

16. A lighting apparatus according to claim 14 wherein the first elongated piece and the second elongated piece are separately formed and subsequently secured together.

17. A lighting apparatus according to claim 14 wherein the elongated opening is a slit.

18. A lighting apparatus according to claim 14 wherein the lighting apparatus has a viewing aide for viewing light emitted by the elongated light source and one or more non-viewing sides, wherein the slit or opening extends along one of the non-viewing sides.

19. A method for making an elongated member for receiving an elongated light source, the method comprising the steps of:
    co-extruding an elongated member with a first material and a second material, the first material being at least semi-transparent and the second material being substantially non-transparent, the elongated member having a cavity for receiving the elongated light source, the cavity being at least partially defined by at least a portion of the first material that extends from the cavity to an outer surface of the elongated member, the elongated member further having an elongated slit or opening that extends between the cavity and the exterior of the elongated member to facilitate insertion and/or extraction of the elongated light source into/from the cavity along a length of the elongated member.

20. A method according to claim 19 wherein the cavity is also at least partially defined by at least a portion of the second material.

21. A method according to claim 19 wherein the second material is at least partially reflective.

22. A method according to claim 21 wherein the second material includes a surface that is shaped to help reflect light toward the first material.

23. A method according to claim 22 wherein the shaped surface is parabolic in shape.

24. A method according to claim 19 wherein the first material includes a surface that is shaped as a lens.

25. A method according to claim 19 wherein the portion of the first material that at least partially defines the cavity extends to two or more separate outer surface regions of the elongated member, wherein at least part of the elongated member between the two or more separate regions is substantially non-transparent.

26. A method according to claim 19 wherein the elongated member has a viewing side for viewing light emitted by the elongated light source and one or more non-viewing sides, wherein the slit or opening extends along one of the non-viewing sides.

27. A lighting apparatus for receiving an elongated light source, comprising:

an elongated member including a first material and a second material, the first material being at least semi-transparent and the second material being substantially non-transparent, the elongated member having a cavity for receiving the elongated light source, the cavity being at least partially defined by at least a portion of the first material that extends from the cavity to an outer surface of the elongated member; and a slit that extends between the cavity and the exterior of the elongated member to facilitate insertion and/or extraction of the elongated light source into/from the cavity along a length of the elongated member.

28. A lighting apparatus according to claim 27 wherein the elongated member has a viewing side for viewing light emitted by the elongated light source and one or more non-viewing sides, wherein the slit extends along one of the non-viewing sides.

29. A method for making an elongated member for receiving an elongated light source, the elongated member having a viewing side, the method comprising the steps of:

co-extruding an elongated member with a first material and a second material, the first material being at least semi-transparent and the second material being substantially non-transparent, the elongated member having a cavity for receiving the elongated light source, the cavity being at least partially defined by at least a portion of the first material that extends from the cavity to two or more separate outer surface regions on the viewing side of the elongated member, wherein at least part of the elongated member between the two or more separate regions on the viewing side is substantially non-transparent.

30. A lighting apparatus for receiving an elongated light source, comprising:

an elongated member including a first material and a second material, the first material being at least semi-transparent and the second material being substantially non-transparent, the elongated member having a cavity for receiving the elongated light source, the cavity being at least partially defined by at least a portion of the tint material that extends from the cavity to an outer surface of the elongated member;

a bumper member; and the elongated member further defining a slot for receiving the bumper member.

31. A lighting apparatus according to claim 30 wherein the first material and the second material are formed as separate pieces, and subsequently secured together.

32. A lighting apparatus according to claim 30 wherein the first material and the second material are formed as a single unitary piece.

33. A lighting apparatus for receiving an elongated light source, comprising:

an elongated member including a first material and a second material, the first material being at least semi-transparent and the second material being substantially non-transparent, the elongated member having a cavity for receiving the elongated light source, the cavity being at least partially defined by at least a portion of the first material that extends from the cavity to two or more separate outer surface regions of the elongated member, wherein at least part of the elongated member between the two or more separate regions is substantially non-transparent.

* * * * *